United States Patent [19]
Goettsch

[11] Patent Number: 6,112,262
[45] Date of Patent: Aug. 29, 2000

[54] SYSTEM AND METHOD FOR EFFICIENTLY TRANSFERRING INFORMATION BETWEEN PROCESSORS

[75] Inventor: Randy L. Goettsch, San Jose, Calif.

[73] Assignee: S3 Incorporated, Santa Clara, Calif.

[21] Appl. No.: 09/128,220

[22] Filed: Aug. 3, 1998

[51] Int. Cl.[7] ............................. G06F 13/14; G06F 13/42
[52] U.S. Cl. .................................. 710/35; 710/29; 710/34
[58] Field of Search ................................. 369/110; 705/7; 702/62; 379/10, 15, 27, 29; 710/35, 34, 33, 29; 370/347, 414; 455/161.02; 348/417; 714/296; 711/213

[56] References Cited

U.S. PATENT DOCUMENTS

| | | | |
|---|---|---|---|
| 3,644,906 | 2/1972 | Mizoguchi | 711/213 |
| 4,703,477 | 10/1987 | Adelmann et al. | 370/474 |
| 4,891,743 | 1/1990 | May et al. | 702/62 |
| 5,008,748 | 4/1991 | Carr et al. | 348/417 |
| 5,068,854 | 11/1991 | Chandran et al. | 714/776 |

Primary Examiner—Daniel H. Pan
Attorney, Agent, or Firm—Fenwick & West LLP

[57] ABSTRACT

System and method transfer information from a primary processor to a co-processor. The primary processor includes an encoder, and the co-processor includes a decoder. To transfer information from the primary processor to the co-processor according to one embodiment of the present invention, the encoder in the primary processor creates an information word. An information word includes a plurality of bits, where each bit corresponds to a different type of information. The encoder sets the state of each bit to indicate whether information corresponding to that bit will be sent. The encoder then sends the information word, followed by the actual information. The decoder decodes the information word to determine what information will be arriving from the co-processor. The decoder identifies the information by the order in which it is received. Each different type of information is pre-assigned to a different register address in the co-processor. After the decoder identifies the information, it determines the address associated with that information.

14 Claims, 30 Drawing Sheets

Sheet 1

| Bus Cycle | Information Sent | Register # Contains |||||||| 
|---|---|---|---|---|---|---|---|---|
| | | 1 | 2 | 3 | 4 | 5 | 6 | 7 | 8 |
| 0 | 1 | S | P | H | U | T | 0 | 0 | N |
| 1 | 2 | S | P | H | U | T | 0 | 0 | N |
| 2 | 0 | S | 0 | H | U | T | 0 | 0 | N |
| 3 | L | S | 0 | L | U | T | 0 | 0 | N |
| 4 | U or x | S | 0 | L | U | T | 0 | 0 | N |
| 5 | T or x | S | 0 | L | U | T | 0 | 0 | N |
| 6 | 1 | S | 0 | L | U | T | 1 | 0 | N |

FIG. 1A

| Register | Contents |
|---|---|
| R010 | x |
| R020 | y |
| R030 | z |
| R040 | Image Data |
| R050 | Width |
| R060 | Height |
| R070 | Depth |
| R080 | Color |
| R090 | Command |
| R100 | Angle |
| R110 | Error Term |
| R120 | Fade |
| R130 | Merge |

FIG. 3

| Bit # | Value | Type of Information Represented by Bit |
|---|---|---|
| 1 | 1 | x |
| 2 | 1 | y |
| 3 | 0 | z |
| 4 | 0 | I |
| 5 | 1 | Width |
| 6 | 0 | Height |
| 7 | 0 | Depth |
| 8 | 0 | Color |
| 9 | 1 | Command |
| 10 | 0 | Angle |
| 11 | 0 | Error Term |
| 12 | 1 | Fade |
| 13 | 1 | Merge |

FIG. 4

| Bus Cycle | Data Sent | Registers Contain | | | | | | | | | | | |
|---|---|---|---|---|---|---|---|---|---|---|---|---|---|
| | | 10 | 20 | 30 | 40 | 50 | 60 | 70 | 80 | 90 | 100 | 110 | 120 | 130 |
| 1 | {1100100010011} | | | | | | | | | | | | | |
| 2 | 7 | 7 | | | | | | | | | | | | |
| 3 | 3 | 7 | 3 | | | | | | | | | | | |
| 4 | 5 | 7 | 3 | | | 5 | 2 | | | | No | No | No | No |
| 5 | Rectangle | 7 | 3 | | | 5 | 2 | | | Rectangle | No | No | No | No |
| 6 | Yes | 7 | 3 | | | 5 | 2 | | | Rectangle | No | No | Yes | |
| 7 | Mix | 7 | 3 | | | 5 | 2 | | | Rectangle | No | No | Yes | Mix |

FIG. 6

| Bus Cycle | Data Sent | Registers Contain | | | | | | | | | | | | |
|---|---|---|---|---|---|---|---|---|---|---|---|---|---|---|
| | | 10 | 20 | 30 | 40 | 50 | 60 | 70 | 80 | 90 | 100 | 110 | 120 | 130 |
| 1 | Rect,Mix,{100} | | | | | | | | | | | | | |
| 2 | Blk | | | | | | | | Blk | Rect | No | No | | Mix |
| 3 | 3 | | | | 3 | 5 | | | Blk | Rect | No | No | | Mix |
| 4 | 5 | | | | 3 | 5 | 7 | | Blk | Rect | No | No | | Mix |
| 5 | 7 | | | | 3 | | | | Blk | Rect | No | No | | Mix |
| | | | | | | | | | | Rect | No | No | | Mix |

FIG. 12

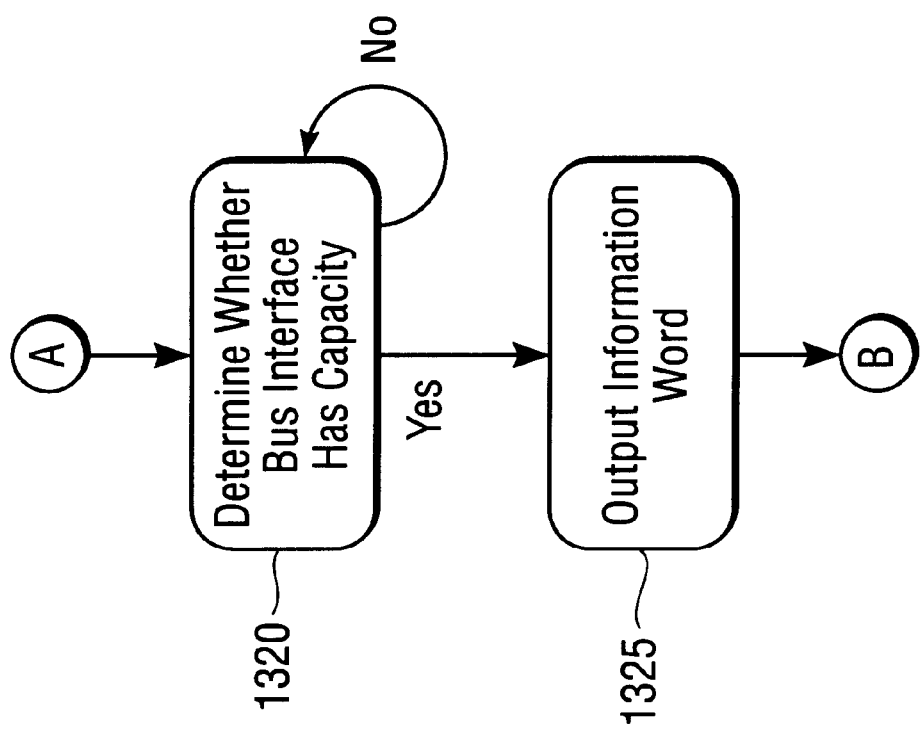

SYSTEM AND METHOD FOR EFFICIENTLY TRANSFERRING INFORMATION BETWEEN PROCESSORS

BACKGROUND OF THE INVENTION

1. Field of the Invention

This invention relates generally to the computer systems, and, more specifically, to a system and method for transferring information between processors.

2. Description of the Background Art

In a computer system, a primary processor may handle command execution and data manipulation by itself. However, when a specific type of command or data needs to be processed at high speeds, a generic multifunction primary processor can hand the job over to a specialized co-processor designed to process that specific type of command or data. For example, a graphics co-processor could efficiently handle all the graphics command and data for the slower more generalized primary processor. To give a specific task to a co-processor, the primary processor sends commands and corresponding data to the co-processor.

A specialized co-processor can often execute the commands faster than the primary processor can send the commands and corresponding data. Therefore, the amount of commands a co-processor is able to execute in a fixed period of time is frequently limited by the rate at which the primary processor is able to send commands and corresponding data to the co-processor.

A variety of methods are known for transferring commands and corresponding data from one processor to another. One such method for transferring this information is referred to as the "separate address, separate data" method, which will be abbreviated the "SASD method" for purposes of this application. In the SASD method, the data and command information transferred to the co-processor is accompanied by the address information specifying the registers in the co-processor to which data and commands are to be written. In the SASD method, some lines of the bus are dedicated to address information and some lines of the bus are dedicated to data and command information. In each bus cycle, data or command information travels across the bus in parallel with its corresponding destination register address. The receiving co-processor then writes the command and data information to the register specified by the user.

The speed of the information transfer in the SASD method is directly proportional to the width of the bus. More bus width means more address, command, and data information can transmitted in a bus cycle. Thus, in order to increase the rate at which information is transmitted, the bandwidth for both the address and the data/command information must be increased. However, increasing the bandwidth means increasing the number of input/output pins used for this transmission in both the processor and the co-processor. In other words, the number of pins on the processors directly limits the number of bus lines that can be used. Because the pins are one of the most expensive parts of the processor, adding speed by adding pins greatly increases the cost of the processor. Thus, increasing speed by increasing the bus bandwidth for the address and data/command information is not an economically desirable solution.

Another known method for transferring information across the bus is the alternate address/data (AAD) method, which alternates sending the address information and data/command information. For instance, for a 32 bit bus, 32 bits of address information will be sent on one bus cycle and a 32 bits of data and command information will be sent on the next bus cycle. In this method, address, data and command information share the same bus lines. For the same number of bus lines used, this method is not as fast as the SASD method because the data/command information and the address information alternate bus cycles. In general, this method is one half the speed of the SASD method for the same bus bandwidth.

A faster information transfer is achieved by transmitting information in a "burst" mode, such as the burst mode of the PCI bus developed by Intel Corporation. As in the AAD method described above, the address information and data/command information share the same bus lines in the burst mode.

In conventional burst modes, address information is sent only for the first piece of command or data information sent in a burst sequence. Address information does not accompany subsequent data and command information transmitted in the burst mode. In the conventional burst method, the co-processor assumes information transmitted should be stored at sequential memory addresses. Thus, after the co-processor stores the first bus cycle of information in one of its registers, it stores the data and command information arriving on each subsequent bus cycle at sequential memory addresses.

The advantage of the burst method over the SASD method is that, for the same speed performance, information can be transmitted without requiring as many bus lines as the SASD method. The advantage of the burst method over the AAD method is that the burst mode saves many bus cycles by only sending one bus cycle of address information, thereby increasing the transmission rate. Additionally, bus arbitration for information transmitted using either the SASD method or the AAD method is such that the information is subject to periodic delays, which slow down the transmission process. A burst sequence, however, is not subject to such delays.

The burst mode is typically used by the processor's cache controller for retrieving and storing only information at sequential memory addresses. The burst mode cannot typically be used to send command or control information to a co-processor. In order to send information to a co-processor in the burst mode, the information must be stored in sequential addresses and must be sent in the order of their sequential addresses. Command and control information is not typically stored in sequential addresses.

The fact that a conventional burst mode requires information to be stored in sequential memory addresses causes bus cycles to be wasted when information that is to be stored in non-sequential memory addresses is transferred in the burst mode. This is because more data than is required by the command often needs to be sent in order to maintain the order in which information is to be sent. For example, assume that the processor needs to send data to registers at addressed two, three and six in the co-processor. There are two ways to send the information such that the co-processor correctly writes the information into registers two, three, and six. One such way is to send the information in two burst sequences. The first burst sequence would have the address and data information for register two, as well as the data for register three. The second burst sequence would have the address and data information for register six. The disadvantages with this way are that there may be a delay between each burst sequence (due to bus arbitration) and that the address information for registers two and six has to be sent.

The other way is to send the information in one burst sequence. In order for the co-processor to correctly write the information into registers two, three, and six with this way, the information for registers 2–6 must be sent. FIG. 1a illustrates an example of the contents of the registers having addresses 1–6 and the contents of bus cycles 1–7 where the information is sent in on bus sequence. The first piece of information transmitted is the register address, 2, at which the first piece of data is to be stored. Next the data "O," which is to be written in register 2, is sent on bus cycle 2. Because the transmission is in the burst mode, the address of the next piece of data, "L," need not be sent. Instead, the next address (three) is determined by increasing the previous address by 1, and, therefore "L" is stored in register 3. A bus cycle is wasted sending data to register four because new data does not need to be sent to register 4. Either the data "U" already stored in register four must be re-sent or data indicating no change ("x") must be sent. Another bus cycle is also wasted sending information to register 5 because no new data needs to be sent to register 5. Thus, either the data, "T" already stored in register 5 must be sent, or data indicating no-change ("x") must be sent.

On bus cycle 6, the data, "I" to be stored in register 6 is sent, thereby completing the transfer. Note that if data had not been sent for registers four and five, the data, "I" for register 6 would have been stored in register 4 because incoming data is stored at consecutive addresses.

Therefore, in view of these disadvantages, it is desirable to have a system and method for transferring information in the burst mode without requiring that the data and command information be stored at sequential addresses and without wasting bus cycles on unnecessary data or commands.

SUMMARY OF THE INVENTION

The present invention relates to a computer system and method for transferring information from a primary processor to a co-processor. A system according to the present invention includes a primary processor and a co-processor. The primary processor includes an encoder, and the co-processor includes a decoder.

To transfer information from the primary processor to the co-processor according to one embodiment of the present invention, the encoder in the primary processor creates an information word. An information word includes a plurality of bits, where each bit corresponds to a different type of information. The encoder sets the state of each bit to indicate whether information corresponding to that bit will be sent. The encoder then sends the information word, followed by the information being sent.

The decoder decodes the information word to determine what information will be arriving from the primary processor and in what order. The decoder identifies the information by the order in which it is received. Each different type of information is pre-assigned to a different register address in the co-processor. Therefore, after the decoder identifies the information, it is able to determine the address associated with that information.

According to an alternate embodiment of the invention, the information word includes the command. Additionally, indicator bits in the information word indicate only what optional data will be arriving. The decoder knows what required data will be sent based on the type of command. To save an extra bus cycle, some required data may be placed in the information word.

When a command is repeated the optional data for command will often be the same as for the previous command. According to another embodiment of the present invention, the command and optional data are not retransmitted if they are the same as the previous command and optional data. Instead the encoder transmits just the required data for the repeated command, thereby saving several bus cycles.

In yet another embodiment of the present invention, the primary processor can abort a command sent in a burst cycle by sending another command within the same burst cycle. When the decoder receives the second command, it recognizes that the first command has been aborted.

BRIEF DESCRIPTION OF THE DRAWINGS

FIG. 1a illustrates an example of a known burst transmission.

FIG. 3 illustrates an example of the type of information that may be sent from the primary processor to the co-processor.

FIG. 4 illustrates an example of an information word according to one embodiment of the present invention.

FIG. 6 illustrates an example of an information transfer from the primary processor to the co-processor according to one embodiment of the present invention.

FIG. 12 illustrates an example of an information transfer from the primary processor to the co-processor according to an alternate embodiment of the present invention.

FIGS. 13a–c illustrate a state diagram for an operation of the encoder according to an alternate embodiment of the present invention.

DETAILED DESCRIPTION OF THE PREFERRED EMBODIMENTS

Figure 1B:
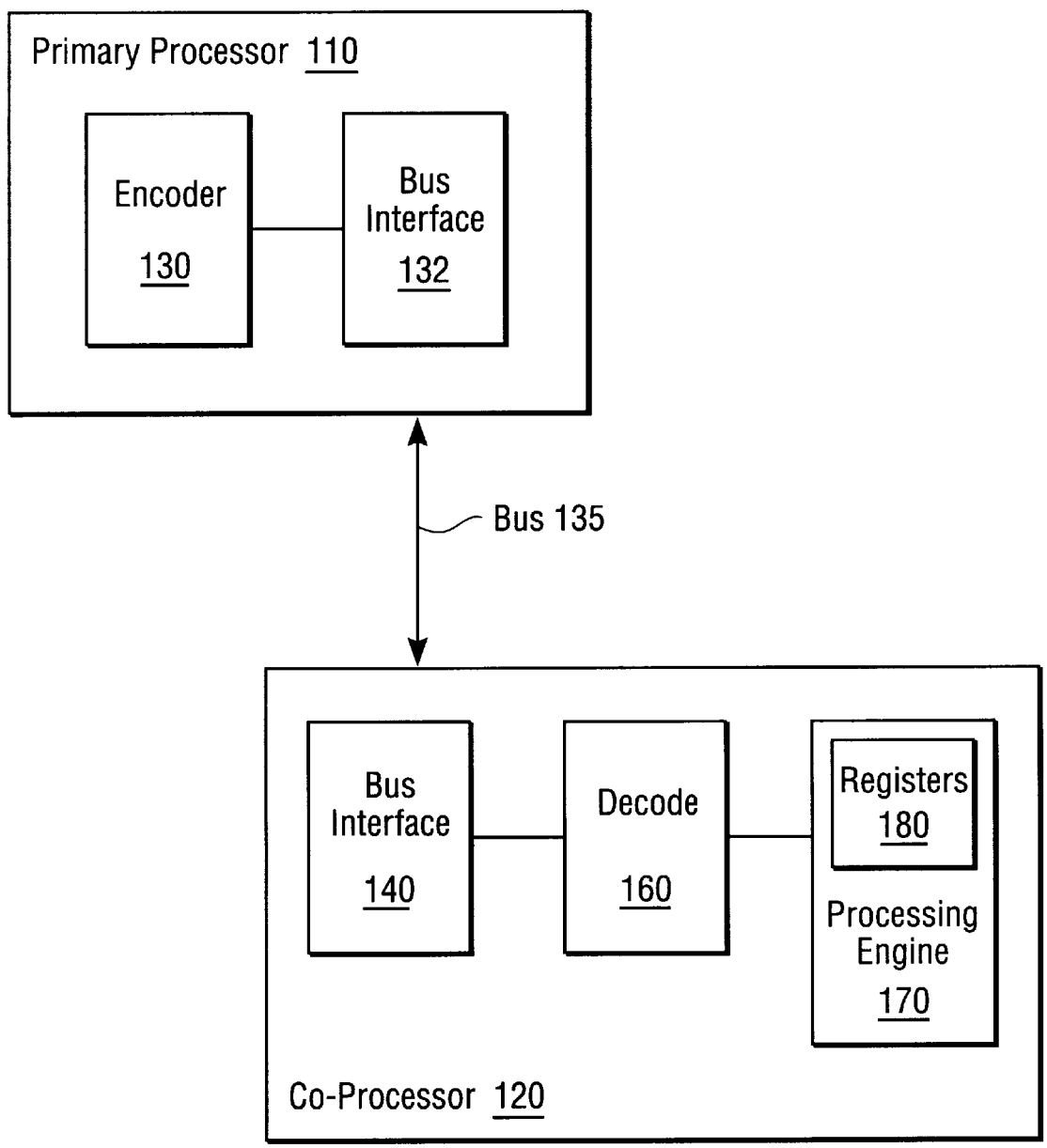
FIG. 1b illustrates a computer system according to an embodiment of the present invention.

FIG. 1b illustrates a computer system 100 according to one embodiment of the present invention. The computer system includes a primary processor 110, such as conventional central processing unit (CPU) (e.g., the PENTIUM Processor manufactured by Intel Corporation). The computer system also includes a co-processor 120. The co-processor 120 illustrated in FIG. 1b may be a graphics processor (e.g., one of the Trio 3D or Savage graphics processors developed by S3, Inc. of Santa Clara, Calif.), or it may be another type of co-processor, such as a disk controller or a network controller.

The primary processor 110 sends the co-processor 120 commands and data to be processed. The CPU includes an encoder 130, which encodes the command and data information, and a bus interface 132, which is coupled to the encoder and which sends the encoded information to the co-processor 120 via a bus 135. In one embodiment, the bus 135 is a standard Peripheral Component Interconnect (PCI) bus, and, in another embodiment, the bus is an Accelerated Graphics Port (AGP) bus. The bus interface 132 is a conventional bus interface 132 (e.g., a PCI bus encoder).

The co-processor 120 includes a bus interface 140, a decoder 160 coupled to the bus interface 140, and a processing engine 170. The processing engine 170 is coupled to the bus interface 140 and the decoder 160. The processing engine includes registers 180, which are conventional registers that store data and commands received by the co-processor. If the co-processor is a graphics processor, then the processing engine maybe a graphics engine, such as one of the graphics engines used in the Trio 3D or Savage graphics processors developed by S3, Inc.

The bus interface 132 of the primary processor 110 transfers information to the bus interface 140 of the co-processor 120, which is a conventional bus interface (e.g., a PCI bus decoder). The bus interface 140 of the co-processor 120 routes the information to the decoder 160. The decoder 160 then determines whether the information is to be decoded according to one of the methods of the present invention. If so, the decoder 160 decodes the information according to one of these methods and then sends the decoded information to the processing engine 170. Otherwise, the decoder just passes the information to the processing engine. The methods according to the present invention of transmitting information from the primary processor 110 to the co-processor 120 are described below.

I

Figure 2:
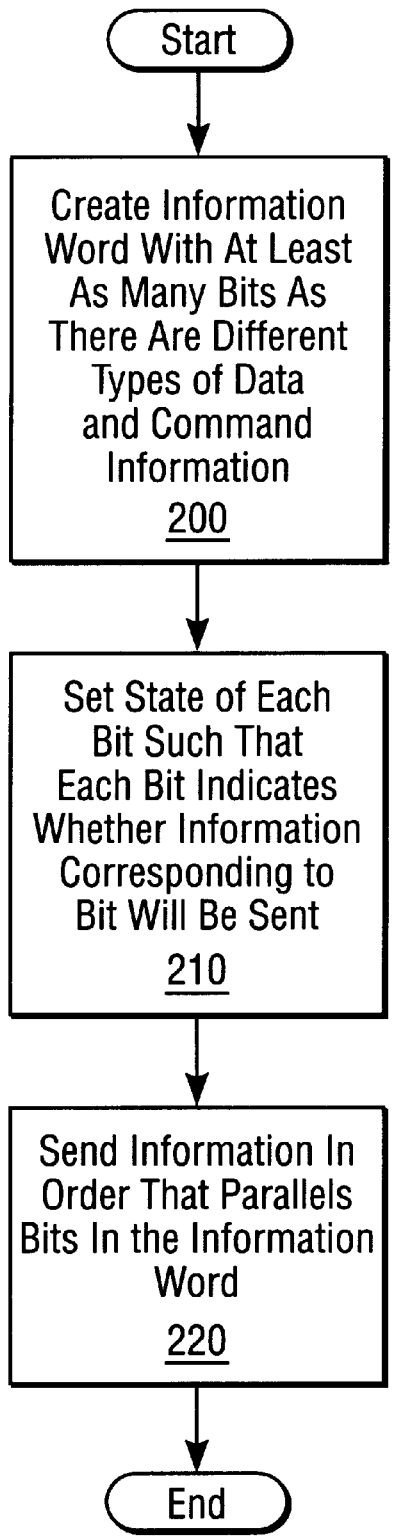
FIG. 2 illustrates the method of a primary processor for sending information to a co-processor according to one embodiment of the present invention.

One method of transferring information from the primary processor 110 to the co-processor 120 is described with respect to the flow chart of FIG. 2. Additionally, this method is described with respect to an example of an information transfer between the primary processor 110 and the co-processor 120. All the different types of information that could be sent to the co-processor 120 from the primary processor 110 in this example are illustrated in the right column of the table in FIG. 3. Each type of information is assigned to a register in the co-processor 120, and the left column illustrates the register assignments for this example. The information in this example is graphics information.

Referring to FIG. 2, to send information to the co-processor 120, the encoder 130 of the primary processor 110 creates 200 an "information word," which is a binary word that identifies the information that will be sent. In this embodiment, the information word has at least as many bits as there are different types of information that might be sent to the co-processor 120. For instance, with respect to the information listed in FIG. 3, there are 13 different types of information which could be sent to the co-processor 120, one of which is a command and twelve of which are types of graphics data (e.g. x-coordinate, color, etc.). Therefore, if FIG. 3 lists all the types of information that might be sent to the co-processor 120 using this method, then the information word for this example would include at least thirteen bits. Each bit of the information word corresponds to a different type of information.

FIG. 4 illustrates an information word for the graphics information listed in FIG. 3. In this information word, bit #1 corresponds to the x coordinate, bit #2 corresponds to the y coordinate, bit #3 corresponds to the z coordinate, and so on. The labels below the information word indicate which type of information corresponds to each bit.

Referring again to the flow chart in FIG. 2, the encoder 130 sets 210 the state of each bit in the information word such that the information word indicates what information will be sent to the co-processor 120. Each bit is set to one of two states, where one state indicates that information corresponding to that bit will be sent to the coprocessor 120 and where another state indicates that information corresponding to that bit will not be sent. In one embodiment, a high bit ("1") Indicates that data corresponding to that bit is being sent, and a low bit indicates that data corresponding to that bit is not being sent.

Assuming that a high bit corresponds to information being sent, the information word illustrated in FIG. 4 indicates that information corresponding to bits 1, 2, 5, 9, 12, and 13 will be sent. Thus, the information word indicates that the x coordinate, the y coordinate, the width, the command, the fade data, and the merge data will be transmitted to the co-processor 120.

After setting the bits in the information word, the primary processor 110 then sends 220 the information to the co-processor 120 in an order that parallels the order of the bits in the information word. For instance, if information corresponding to bit numbers 1, 2 and 5 is being sent to the co-processor 120, the information corresponding to bit #1 will be sent before the information corresponding to bit #2, which will be sent before the information corresponding to bit #5. For reason discussed below, the information is sent without the addresses of the registers in the co-processor 120 at which the information is to be stored. The information is sent in a burst mode, such as the PCI bus burst mode. As is discussed below, since the information can be sent in the burst mode, and without any address information, the number of bus cycles it takes to send the information is greatly reduced in comparison to prior art methods.

In one embodiment (which is illustrated in FIG. 1b), the encoder 130 does not output information directly onto the bus 135, but passes all information to be sent across the bus to the bus interface 132. Even though addresses are not actually sent across the bus 135 according to the method illustrated in FIG. 2, the encoder 130 must pair each separate information word, data, or command with an address before sending the information word, data, or command to the bus interface 132. If the information word, command, and data is to be sent in the burst mode, the bus interface 132 determines whether the addresses are in some sort of sequential order, and, if so, discards all but the first address.

The bus interface 132 then sends the first address, the information word, the data, and the command across the bus 135 in the burst mode.

In the present invention, the command and data information sent to the co-processor 120 may not necessarily have sequential addresses. Therefore, in order for the command and data to be sent in the burst mode, the encoder 130 must pair each separate data and command with a dummy address, where all the dummy addresses are in some sort of sequential order. The dummy addresses are memory mapped I/O addresses within a select range.

When the bus interface 132 receives the data and command, paired with the memory mapped I/O addresses, from the encoder 130, it determines that the addresses are sequential and discards all but the first address. The first address is sent in the first bus cycle of the burst transmission, followed by the information word, command and data (note that the command does not necessarily follow directly after the information word).

When the bus interface 140 of the co-processor 120 receives the burst transmission, it recreates the dummy addresses that were discarded by the bus interface 132 of the processor 110. The addresses are recreated by incrementing the memory mapped I/O address received on the first bus cycle.

Figure 5:
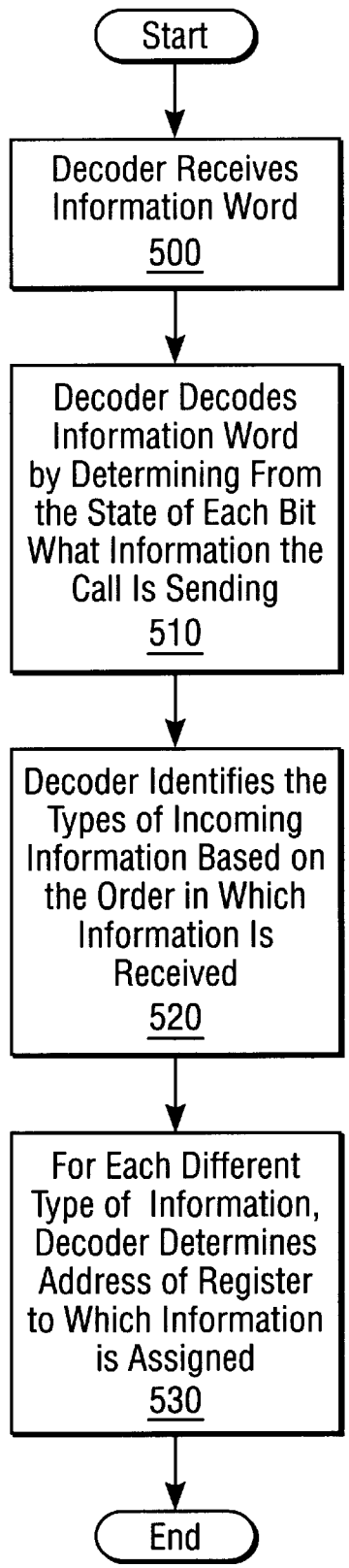
FIG. 5 illustrates a method of the decoder according to one embodiment of the present invention.

When the decoder 160 receives a memory mapped I/O address within the select range, it knows the address is not a real memory device address and expects to receive an information word, command, and data in accordance with the method illustrated in FIG. 5. The decoder 160 discards the dummy address, and determines the actual address associated with the information received.

This dummy address method is also used for sending information in accordance with the methods described in sections III–V herein. For simplicity, the steps of adding and removing dummy addresses are not illustrated in FIGS. 2, 5, 7–9, 11, 13–19, but, in at least one embodiment, the dummy addresses are paired with the information output by the encoder 130 and received by the decoder 160.

FIG. 5 illustrates the method of the decoder 160 for receiving information sent by the primary processor 110 in the above described method. The bus interface 140 of the co-processor 120 first receives the information and transfers it to the decoder 160. The decoder 160 receives 500 the information word and decodes 510 it by determining from the state of each bit what information the primary processor 110 is sending. As discussed above, each bit of the information word is in one of two states, where one state indicates that information corresponding to a bit is being sent and where another state indicates that information corresponding to the bit is not being sent.

Since the information is sent in an order that corresponds to the order of the bits in the information word, the decoder 160 knows the order in which the information will arrive. Since the decoder 160 knows what type of information will arrive and knows in what order to expect the information, it identifies 520 the information by the order in which it arrives. Each type of information (e.g. x-coordinate, y-coordinate) is assigned to a register. In order to determine to which register the incoming information should be written, the decoder 160 identifies the type of information that comes in on each bus cycle and determines 530 the address of the register assigned to that type of information. Therefore, the primary processor 110 does not need to send the address information along with the command and data information because, once, the decoder identifies the information, the decoder can determine the addresses corresponding to the command and data information.

FIG. 6 illustrates an example of an information transfer from the primary processor 110 to the coprocessor 120 in accordance with the above described method. In this example, the primary processor 110 transmits the following command and data information to the co-processor 120:

| Type of Information | Content of Information |
| --- | --- |
| X-coordinate | 7 |
| Y-coordinate | 3 |
| Width | 5 |
| Command | Draw Rectangle |
| Fade | yes |
| Merge | Mix |

On bus cycle 1, the primary processor 110 sends the co-processor 120 the information word illustrated in FIG. 4 (Note: on bus cycle 0, a dummy address is sent). Since the bits 1, 2, 5, 9, 12, and 13 are high, the information word indicates that the primary processor 110 is sending the above-listed information to the co-processor 120.

On bus cycle 2, the primary processor 110 transmits the x-coordinate data to the co-processor 120. Since the first high bit in the information word is bit #1, the co-processor 120 knows that the information transmitted on bus cycle 2 is the x-coordinate data. The left column of FIG. 3 illustrates the registers to which each type of data in the example are assigned. The x-coordinate data is assigned to register R010, and, therefore, the co-processor 120 stores the information sent on bus cycle 2 in register R010.

On bus cycle 3, the primary processor 110 sends the y-coordinate data to the co-processor 120. The co-processor 120 knows to expect the y coordinate data because the next high bit of the information word is bit #2, which corresponds to the y-coordinate data. The y-coordinate data is assigned to register R020, and, therefore, the co-processor 120 stores the information transmitted on bus cycle 3 in register R020. On bus cycle 4, the primary processor 110 sends the width data to the co-processor 120. Since the next high bit in the information word is bit #5, which corresponds to the width data assigned to register R050, the co-processor 120 stores the information transmitted on bus cycle 4 in register R050. On bus cycle 5, the co-processor 120 sends the command data, on bus cycle 6, the fade data, and on bus cycle 7, the merge data. The next high bits are 9, 12, and 13, which corresponds to the command, fade data, and the merge data assigned to registers R090, R120, and R130, respectively. Thus, the co-processor 120 stores the information transmitted on bus cycles 5, 6, and 7 is stored in registers R090, R120, and R130, respectively. No new information is stored in registers R030, R040, R060, R070, R080, R100, and R110 because the bits in the information word corresponding to the information to which those registers are assigned are low. Some of the registers (e.g., register RO60) may include information previously stored, and this information is retained in these registers until new information for these registers is received.

Figure 7A:
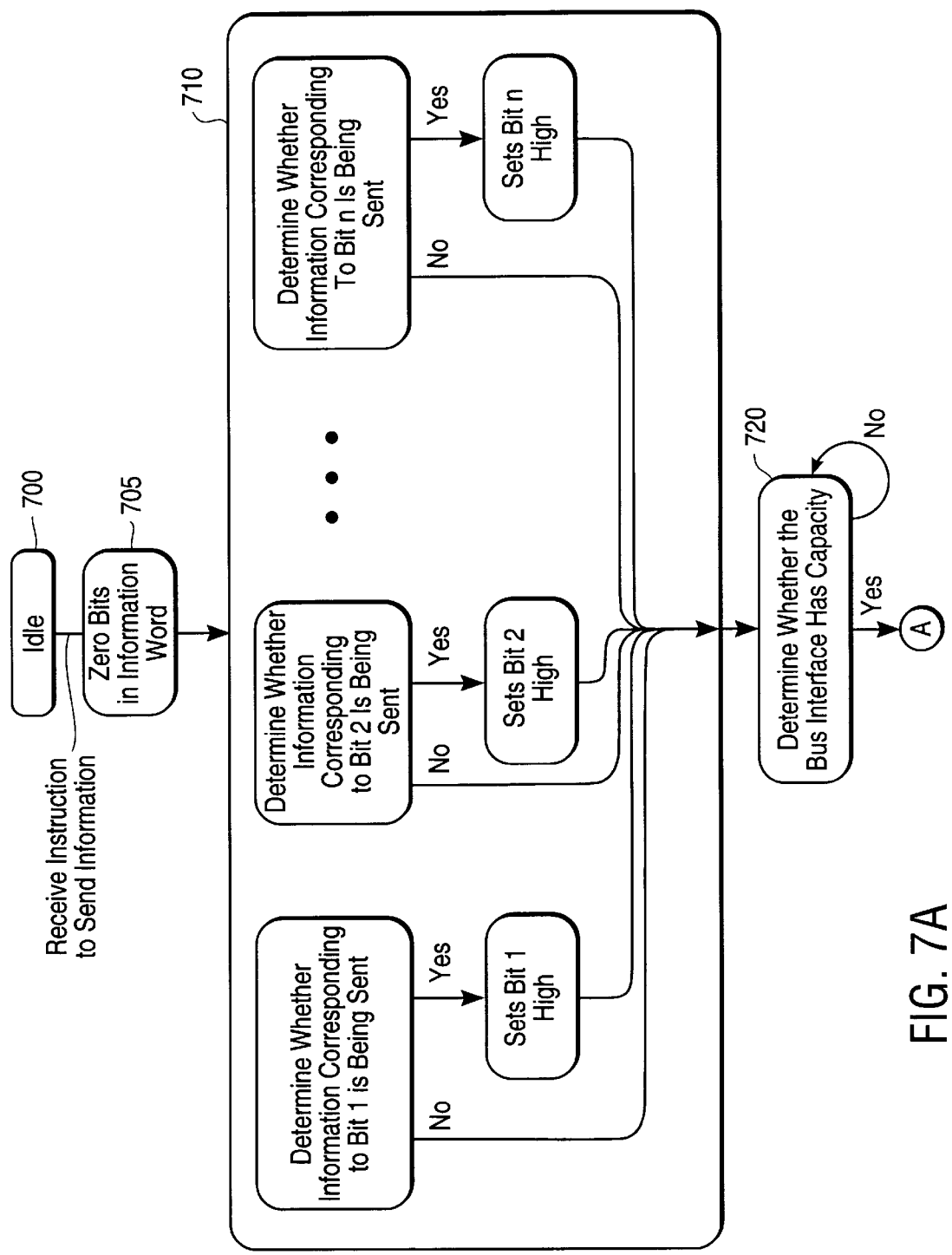
FIGS. 7a–b illustrate a state diagram for an operation of the encoder according to one embodiment of the present invention.
Figure 7B:
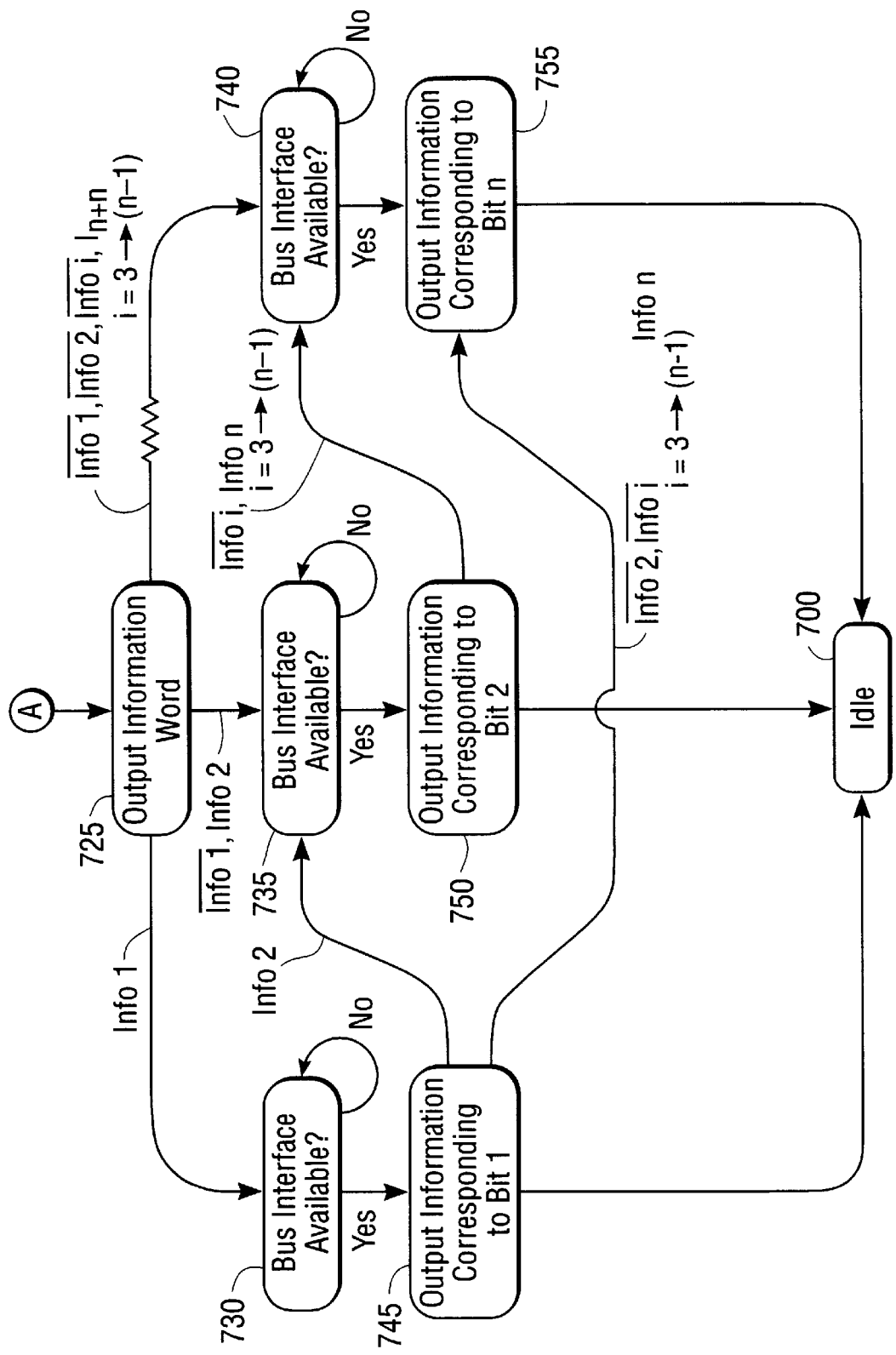

FIGS. 7a–b are a state diagram illustrating the states of the encoder 130 in performing the method of FIG. 2. The encoder 130 is initially in the idle state 700, and, when it receives a command to send information to the co-processor 120, it enters state 705, where it zeroes all the bits that will make up the information word. The encoder 130 then moves to state 710, where, for each of the bits, it determines whether information corresponding to that bit will be sent to the co-processor 120. If information corresponding to a particular bit will be sent to the co-processor 120, the encoder 130 sets that bit high. In one embodiment, all the determining steps in state 710 are performed in parallel, and all the setting steps are performed in parallel.

After all the appropriate bits have been set, the encoder 130 enters state 720 and determines whether the bus interface 132 has capacity to receive the information word. If the bus interface 132 does not have capacity, the encoder 130 remains in state 720. If the bus interface 132 has capacity, the encoder 130 outputs the information word to bus interface 132 for transmission to the decoder (state 725).

For each piece of information that the encoder 130 is to send to the co-processor 120, the encoder 130 determines whether the bus interface has capacity 132(states 730–740), and, if the bus interface 132 has capacity, the encoder 130 outputs that piece of information to the bus interface 132 (states 745–755). If the interface 132 does not have capacity, the encoder 130 waits until the bus interface 132 has capacity. For instance, if the information corresponding to bit 1 is to be sent to the co-processor 120, the encoder 130 enters state 730, where it determines whether the bus interface 132 has capacity. In response to the bus interface 132 having capacity, the encoder 130 outputs the information on the bus interface 132. If the information corresponding to bit 2 is to be sent, the encoder 130, then moves to state 735. Otherwise, assuming additional information is to be sent, the encoder 130 then moves to a state corresponding to the next high bit in the information word. For example, if information corresponding to bit n in the information word is to be sent next, the encoder 130 would move to state 740 and then state 755. Once all the information corresponding to the high bits has been sent, the encoder 130 returns to idle state 700.

Figure 8:
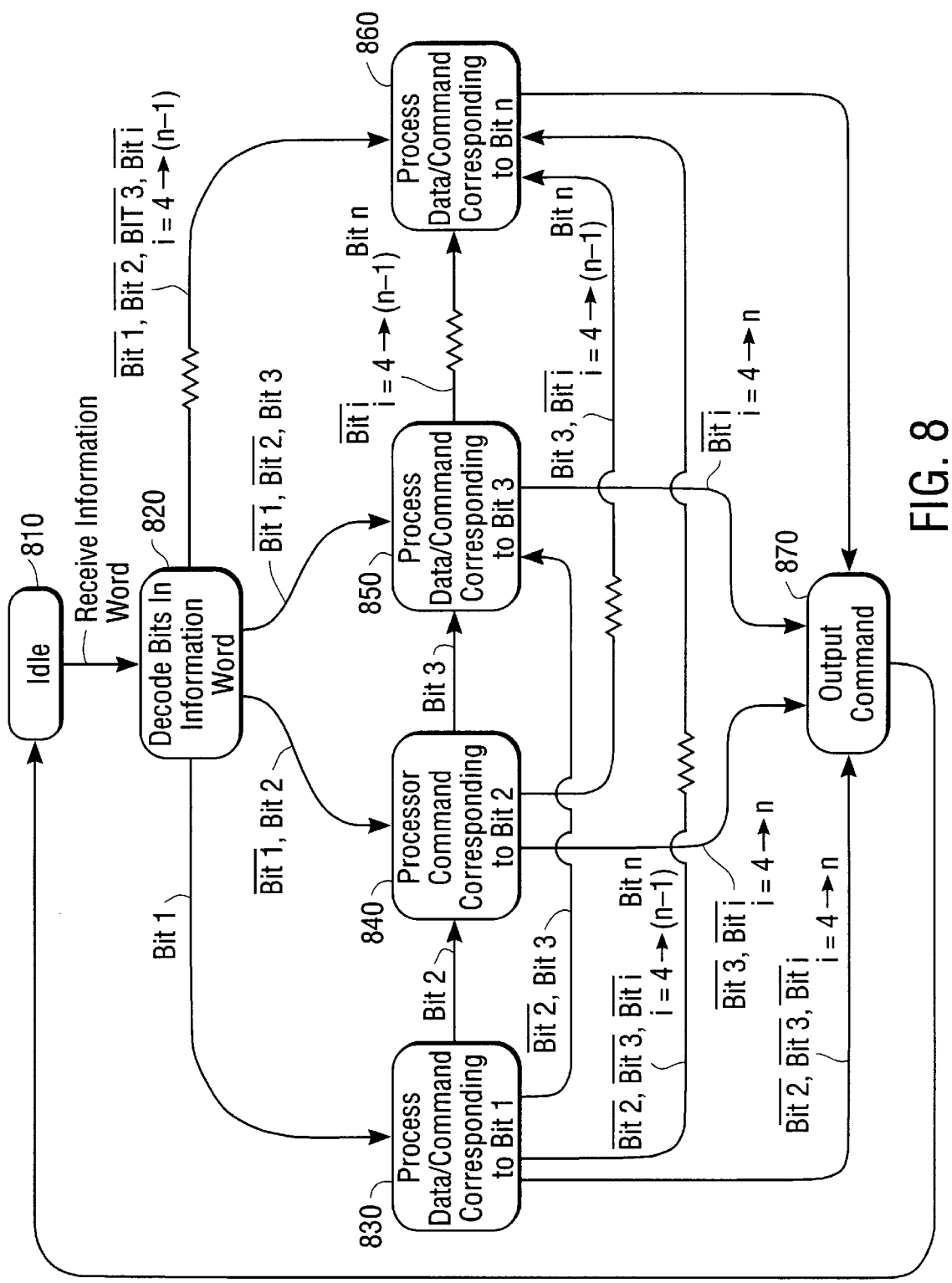
FIG. 8 illustrates a state diagram for an operation of the decoder according to one embodiment of the present invention.

FIG. 8 is a state diagram illustrating the states of the decoder 160 in performing the method of FIG. 5. The decoder 160 is initially in idle state 810, and when it receives an information word, it switches to the state 820, where it decodes the bits in the information word. The decoder 160 then processes the data or command corresponding to each high bit. If a high bit corresponds to data, processing includes receiving the data, determining the address of the register in the processing engine 170 associated with that type of data, and sending the data and its corresponding address to the processing engine 170. If a high bit corresponds to a command, processing includes receiving the command and temporarily storing the command for the purpose of sending it to the processing engine after all the data in the burst sequence has been processed.

If bit 1 is high, the decoder 160 moves to state 830 for processing the data or command corresponding to bit 1. From state 830 the decoder 160 then either moves to a state for processing the data or command that corresponds to the next high bit or, if there are no more high bits, the decoder 160 moves to state 870, where it sends the command to the processing engine 170. If bit 1 is low, but bit 2 is high, the decoder 160 moves to state 840 for processing the data or command corresponding to bit 2. After state 840, the processor then moves to the state for processing the data or command corresponding to the next high bit or, if there are no more high bits, the decoder 160 moves to state 870. This pattern continues until all the information in the burst sequence has been processed.

II

Some types of data are required for certain commands. Data that is required for a certain command will be referred to as "required data." Data that is optional for a certain command will be referred to as "optional data."

The bits in the information word that indicate what type of data will be sent by the primary processor 110 will be referred to as "indicator bits." In an alternate embodiment of the present invention, the indicator bits in the information word correspond only to optional data. In this embodiment, the command is part of the information word, and the decoder 160 knows what required data will be sent based on the type of command. The indicator bits corresponding to the required data need not be sent because they would always have the same state, namely a state (e.g., high) that indicates that the required data is being sent.

Figure 9:
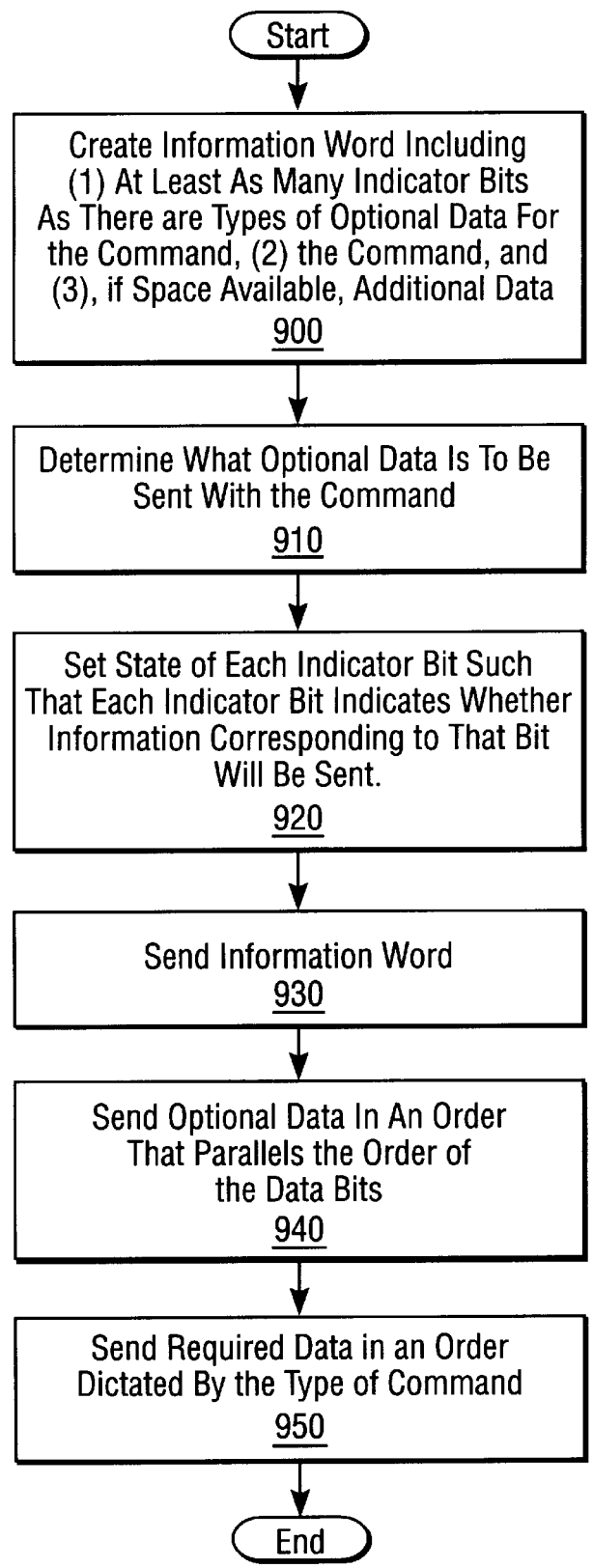
FIG. 9 illustrates a method of the encoder according to an alternate embodiment of the present invention.

FIG. 9 illustrates the method of the encoder 130 of the primary processor 110 for sending information to the co-processor 120 using this alternate method. To send information to the co-processor 120, the encoder 130 of the primary processor 110 creates 900 an information word including (1) at least as many indicator bits as there are types of optional data for the command, (2) the command, and (3), if space available, additional data corresponding to the command.

The number of indicator bits in an information word will depend on the command being sent. Data that is optional for one command may be required for another command. Different commands have different optional data. For instance, for one command there may be two types of optional data, and, therefore, two indicator bits in the information word, and for another command there may be six types of data, and, therefore, 6 indicator bits in the information word. Because, in this embodiment, indicator bits are only used for optional data and not for required data, the information word has more room for other information. Putting the command in the information word saves at least one bus cycle because the command does not have to be transmitted on another bus cycle. Note that if there are so many indicator bits in the information word that information word is greater than the bus width (e.g., 32 bits), then the information word is transmitted over multiple bus cycles.

Another bus cycle may also be saved if there is enough room in the information word for another piece of data. Take, for instance the following scenario:

The information word is four bytes to match the bus width.

The command takes up 8 bits.

The optional indicator bits take up 16 bits.

In this scenario only 24 bits (eight for the command and 16 for the indicator bits) are used for the command and optional indicator bits. This leaves one byte in the information word for other data. In one embodiment, the extra data inserted into the information word is one or more pieces of required data.

Figure 10:
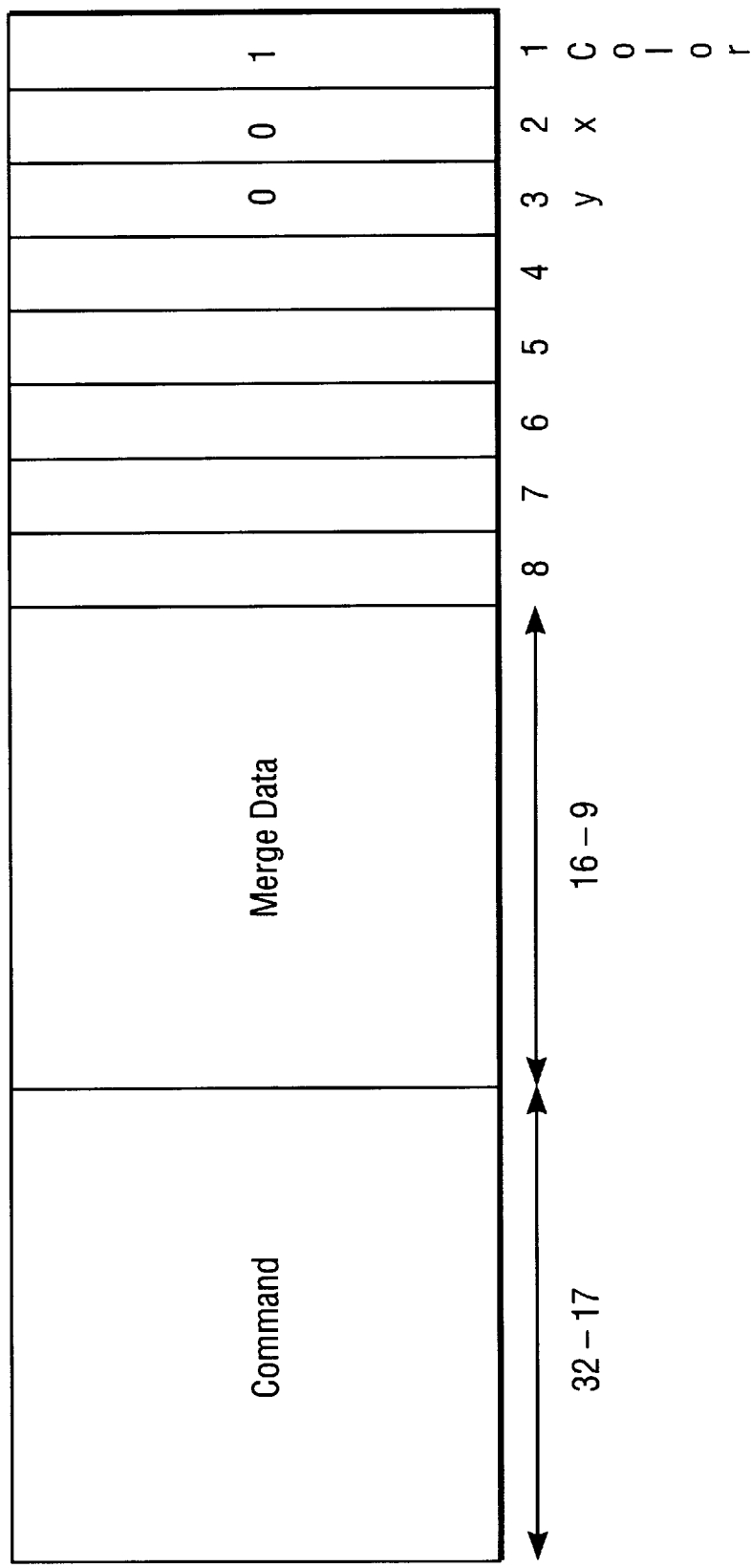
FIG. 10 illustrates an example of an information word according to an alternate embodiment of the present invention.

Assume that with respect to the graphics information listed in FIG. 3, the height, the image data, the width, and the merge data are all required for a draw rectangle command, and the color, x, and y data are optional for a draw rectangle command. FIG. 10 illustrates an information word for this example. There are only three bits for the optional data because there are only three types of optional data. Bit #1 corresponds to color data, bit #2 corresponds to x data, and bit #3 corresponds to the y data.

Bits 17–32 are used for the draw rectangle command, and bits 9–16 are used to transmit the merge data. A bus cycle is saved by inserting the merge data into the information word instead of sending it separately on another bus cycle.

Referring again to the flow chart in FIG. 9, the encoder 130 determines 910 what optional data, if any, is to be sent along with the command. The encoder 130 then sets 920 the state of each indicator bit such that the information word indicates whether the data corresponding to that indicator bit will be sent. Each indicator bit is set to one of two states, where one state indicates that information corresponding to that indicator bit will be sent to the co-processor 120 and where another state indicates that information corresponding to that indicator bit will not be sent. In one embodiment, a high indicator bit indicates that data corresponding to that bit is being sent, and a low indicator bit indicates that data corresponding to that bit is not being sent. Assuming that a high bit corresponds to information being sent, the information word illustrated in FIG. 10 shows that the x and y data, corresponding to bits #2 and 3, respectively, will not be sent and that the color data, corresponding to bit 1, will be sent.

After creating the information word, the primary processor 110 sends 930 the information word to the co-processor 120. The encoder 130 then sends 940 the optional data, followed 950 by the required data. The optional data is transmitted in an order that parallels the order of the indicator bits. For instance, if information corresponding to indicator bits 1, 2, and 3 is being sent to the co-processor 120, the information corresponding to bit #1 will be sent before the information corresponding to bit #2, which will be sent before the information corresponding to bit #3. The required data is sent in a predetermined order dictated by the command. The information word, the optional data, and the required data are sent in the burst mode.

Figure 11A:
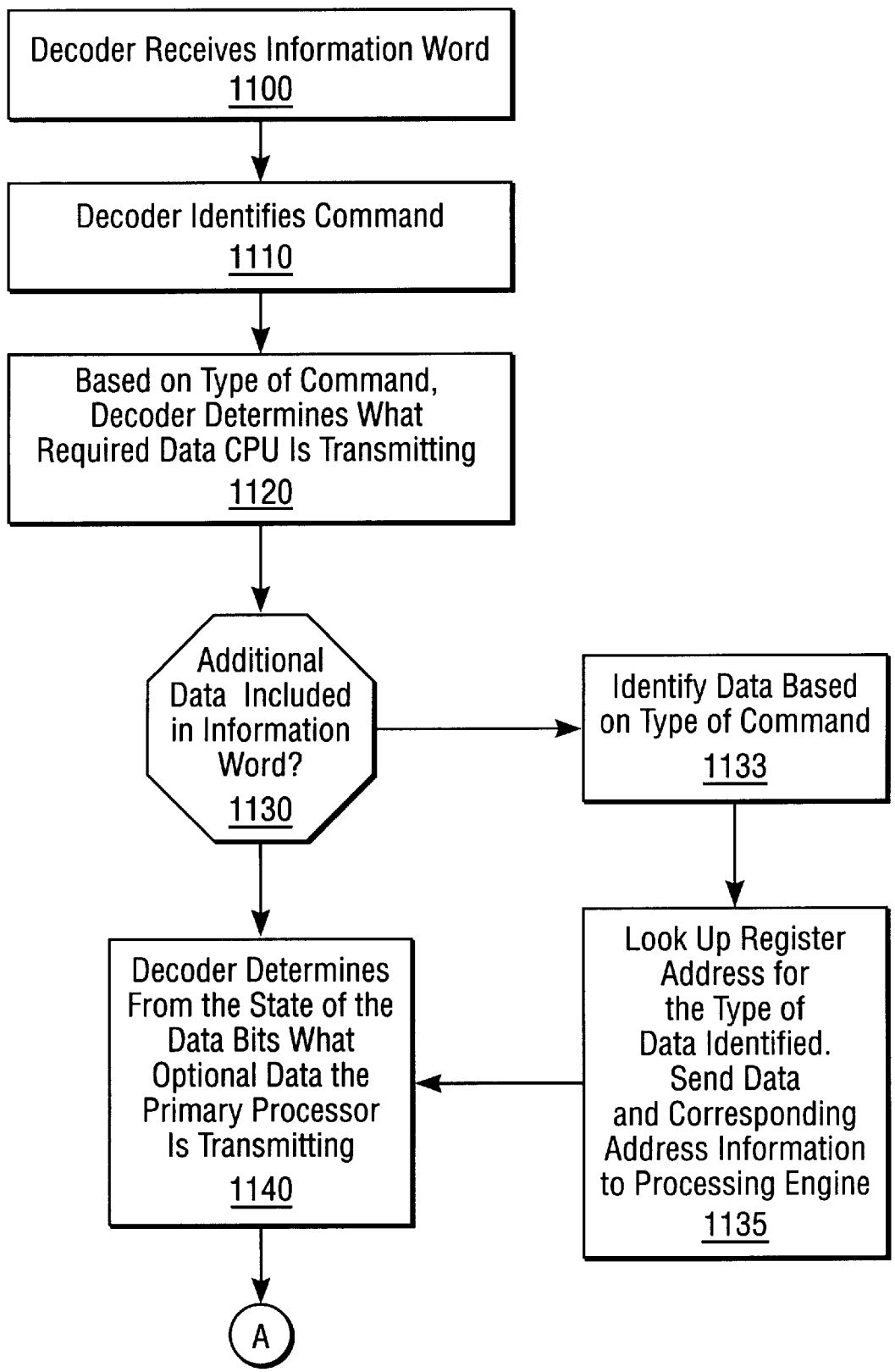
FIGS. 11a–b illustrate a method of the decoder according to an alternate embodiment of the present invention.
Figure 11B:
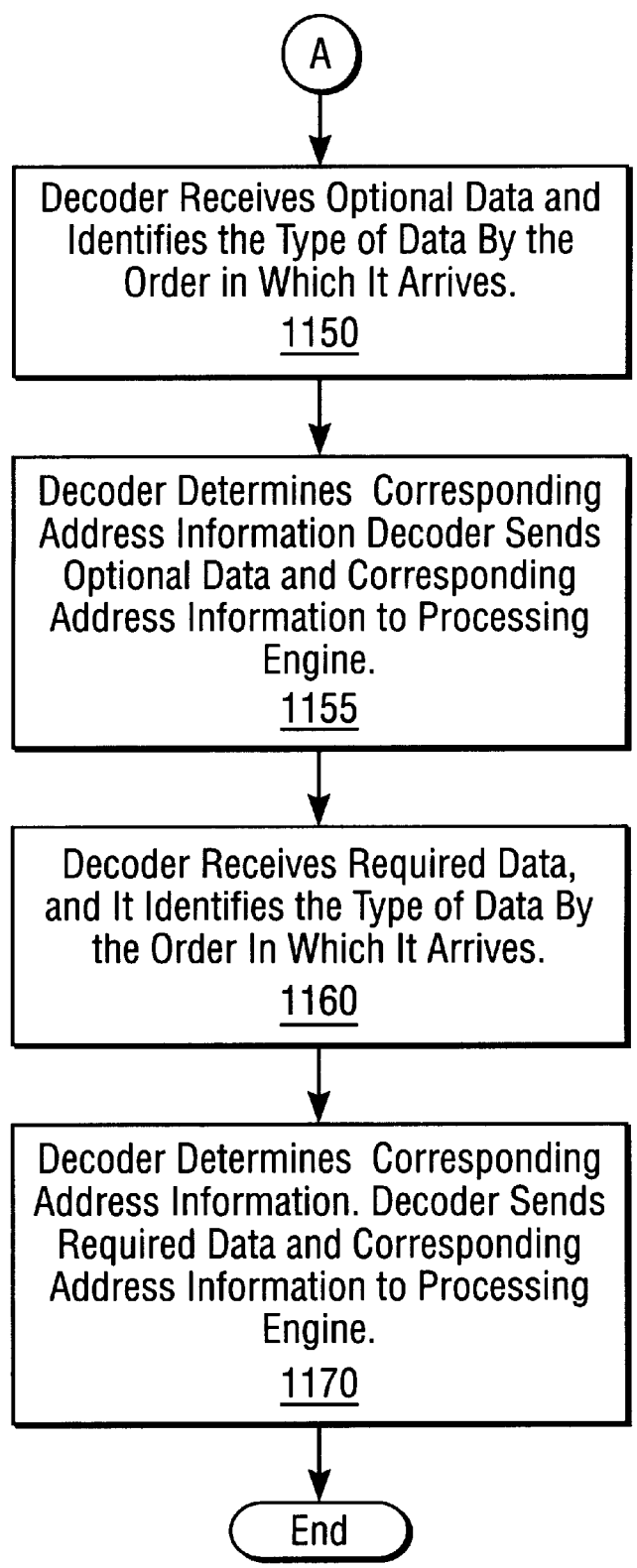

FIGS. 11a–b, illustrate the method of the decoder 160 for receiving information sent by the primary processor 110 in accordance with the method illustrated in FIG. 9. The bus interface 190 of the co-processor 120 first receives the information word and transfers the information word, and subsequent information transferred in the same burst sequence, to the decoder 160.

The decoder 160 receives 1100 the information word and identifies 1110 the command sent in the information word. The decoder 160 then determines 1120 what types of required data correspond to the received command, and the decoder 160 expects to receive this required data from the primary processor 110.

As stated above, for certain commands, additional data will be included in the information word. Based on the type of command, the decoder 160 determines 1130 whether the information word carries additional data. If the information word carries additional data, then the decoder 160 identifies 1133 the type of additional data based on the command and determines 1135 the address of the register corresponding to that type of data. The decoder then sends 1135 the additional data, as well as the corresponding address information, to the processing engine 170. After the additional information is sent to the processing engine 170, or if the information word does not include additional data, the decoder 160 decodes the indicator bits section of the information word.

The decoder 160 decodes the indicator bits by determining 1140 from the state of the bits what optional information the primary processor 110 is sending. As discussed above, each indicator bit of the information word is in one of two states, where one state indicates that the information corresponding to the bit is being sent and where another state indicated that information corresponding to the bit is not being sent.

In one embodiment, the decoder 160 receives the optional data first and then the required data. As discussed above, the optional data is sent in an order that corresponds to the order of the indicator bits in the information word, and, consequently, the decoder 160 knows the order in which the optional data will arrive. Since the decoder 160 knows what type of information will arrive and knows in what order to expect the information, it identifies 1150 each bus cycle of the optional data by the order in which it arrives. After each piece of optional data is identified, the decoder 160 looks up 1155 the register address in the processing engine 170 corresponding to that type of data. The decoder 160 then sends 1155 the optional data and its corresponding address information to the processing engine.

After all the optional data is received and identified, the decoder 160 receives and identifies 1160 the required data. The required data arrives in a predetermined order which depends on the type of command. Thus, after the decoder 160 identifies the type of command, it knows the order in which the required data will arrive and identifies each type of required data by the order in which the information is received. Note that one piece of required data may have already been part of the information word.

After each piece of required data is identified, the decoder 160 determines 1170 the address of the register corresponding to that piece of data arid transfer the data and its address to the processing engine 170.

FIG. 12 illustrates an example of information transferred to the co-processor 120 in accordance with the above-described method. In this example, the primary processor 110 transmits the following command and data information to the co-processor 120:

| Type of Information | Content of Information | Required |
|---|---|---|
| command | draw rectangle | — |
| image data | 3 | yes |
| color | black | no |
| width | 5 | yes |
| merge | mix | yes |
| height | 7 | yes |

Assume that for a draw rectangle command the merge data is part of the information word, and the other required data is sent in the order in which it is listed above. On bus cycle 1, the primary processor 110 sends the co-processor 120 the information word illustrated in FIG. 10. The decoder 160 determines that the command is to draw a rectangle, and, consequently, expects to receive the required data for such a command, namely the height, the image data, the width, and the merge data. Additionally, since bit 1 of the indicator bits is high, the decoder 160 expects to receive the optional color data. The primary processor 110 sends the optional data first, and, thus, on bus cycle 2, the primary processor 110 sends the color data, which is stored in register R030 (see FIG. 3 for example list of register assignments). After the co-processor 120 receives the optional data, it expects the required data, except for any required data included with the information word. In this example, the merge data was included in the information word, and, therefore, the decoder 160 does not expect the merge data to arrive with the rest of the required data. The primary processor 110 sends the rest of the required data on bus cycles 3–7, and the co-processor 120 stores the data in their assigned registers.

Figure 13A:
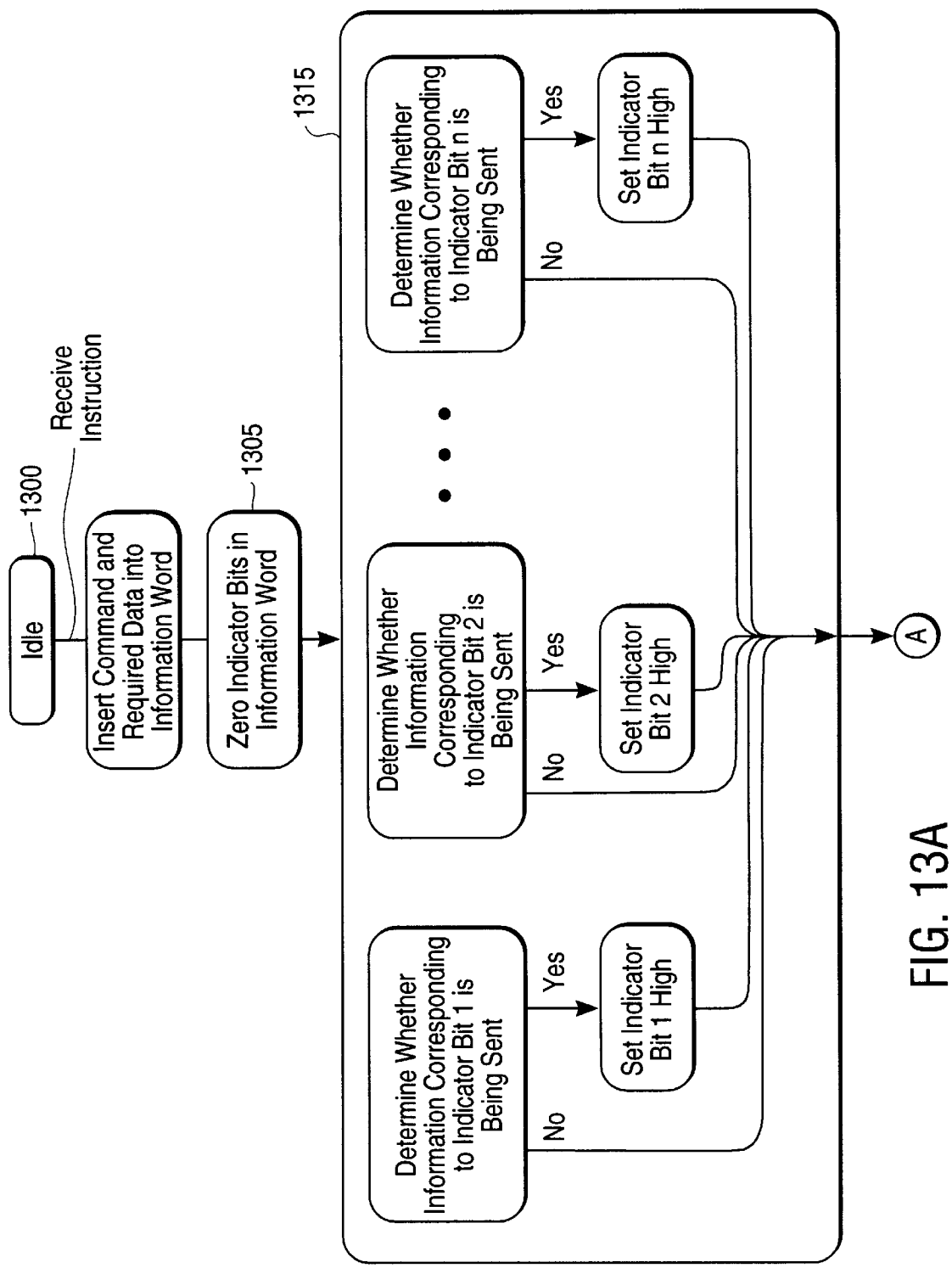
Figure 13C:
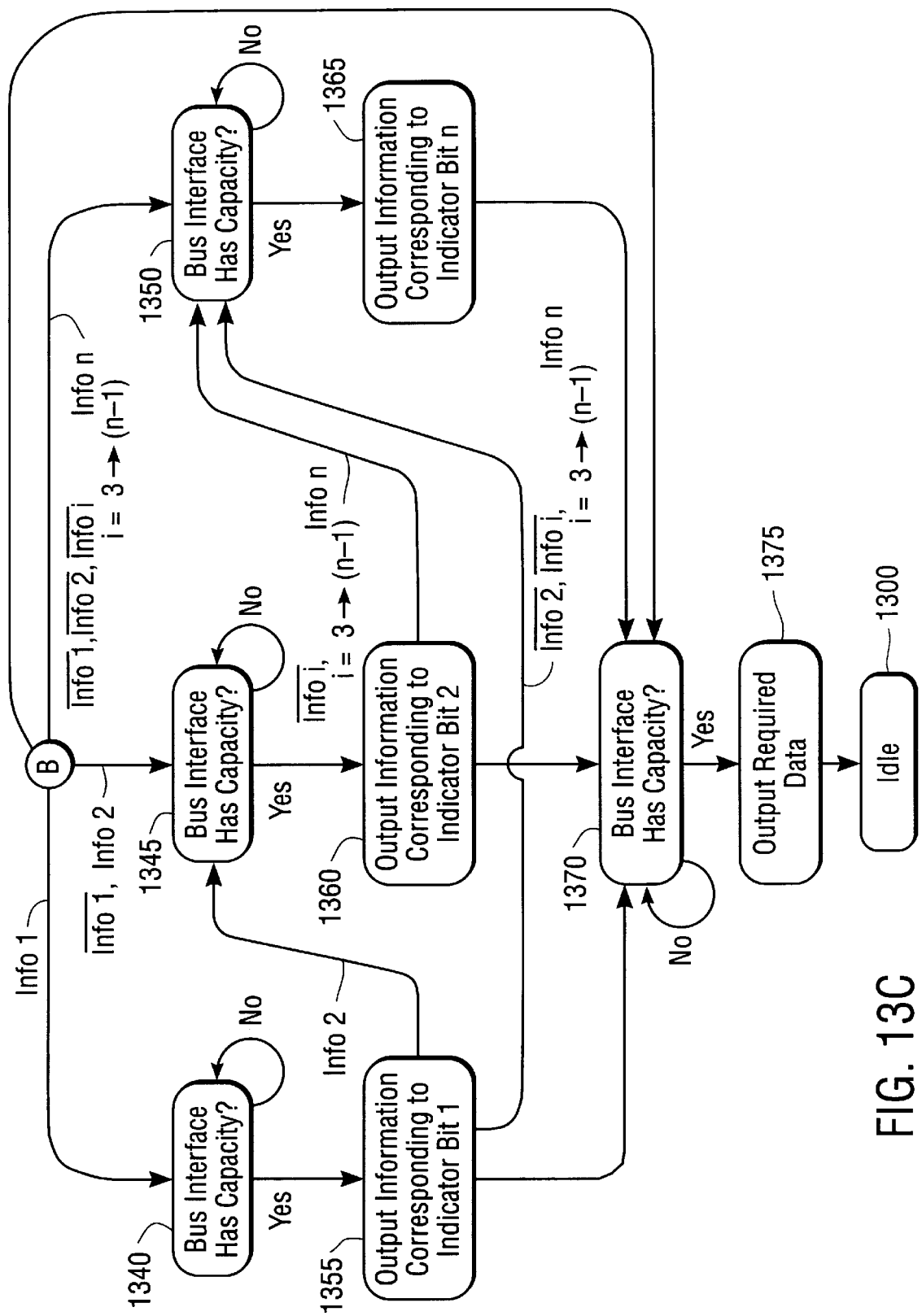

FIGS. 13a–c illustrate the states of the encoder 130 in performing the method of FIG. 9. The encoder 130 is initially in the idle state, 1300 and, when it receives an instruction to send a command and data to the co-processor 120, it enters state 1305, where it inserts the command to be sent to the co-processor 120 into the information word. If the information word is to include some required data, the encoder 130 inserts the required data into the information word. In one embodiment, the command and required data are inserted into the information word at the same time, and, in other embodiment, they are inserted in sequence.

After state 1305, the encoder 130 zeroes the indicator bits in the information word (state 1310). The encoder 130 then moves to state 1315, where, for each of the indicator bits, it determines whether optional data corresponding to that bit will be sent to the co-processor 120. If optional data corresponding to a particular bit will be sent to the co-processor 120, the encoder 130 sets that bit high. In one embodiment, all the determining steps in state 1315 are performed in parallel, and all the setting steps in state 1315 are performed in parallel.

After all the appropriate indicator bits have been set, the encoder 130 enters state 1320 and determines whether the bus interface 132 has capacity to receive the information word. If the bus interface 132 does not have capacity, the encoder remains in state 1320. If the bus interface 132 has capacity, the encoder 130 outputs the information word to the bus interface 132 for transmission to the decoder 160.

For each piece of optional data the encoder 130 is to send to the co-processor 120, the encoder 130 determines whether the bus interface 132 has capacity to receive the data (state 1340–1350) and, if the bus interface 132 has capacity, the encoder outputs that piece of optional data to the bus interface 132 (states 1355–1365). If the bus interface 132 does not have capacity to receive the data, the encoder 130 waits until the bus interface 132 has such capacity. For instance, if the optional data corresponding to indicator bit 1 is to be sent to the co-processor 120, the encoder 130 enters state 1340, where it determines whether the bus interface 132 has capacity to receive the data. In response to the bus interface 132 having capacity, the encoder 130 outputs the optional data on the bus 135. If the optional data corresponding to indicator bit 2 will be sent, the encoder 130, then moves to state 1345. Otherwise, assuming additional optional data is to be sent, the encoder 130 moves to a state corresponding to the next high indicator bit. For example, if optional data corresponding to indicator bit n is to be sent next, the encoder 130 would move to state 1350 and then state 1365.

After outputting any optional data, the encoder 130 moves to state 1370 and again determines whether the bus interface 132 has capacity to receive the required data. If not, the encoder 130 remains in state 1370. If so, the encoder 130 outputs the required data (state 1375). After the required data has been sent to the bus interface 132, the encoder returns to idle state 1300.

Figure 14A:
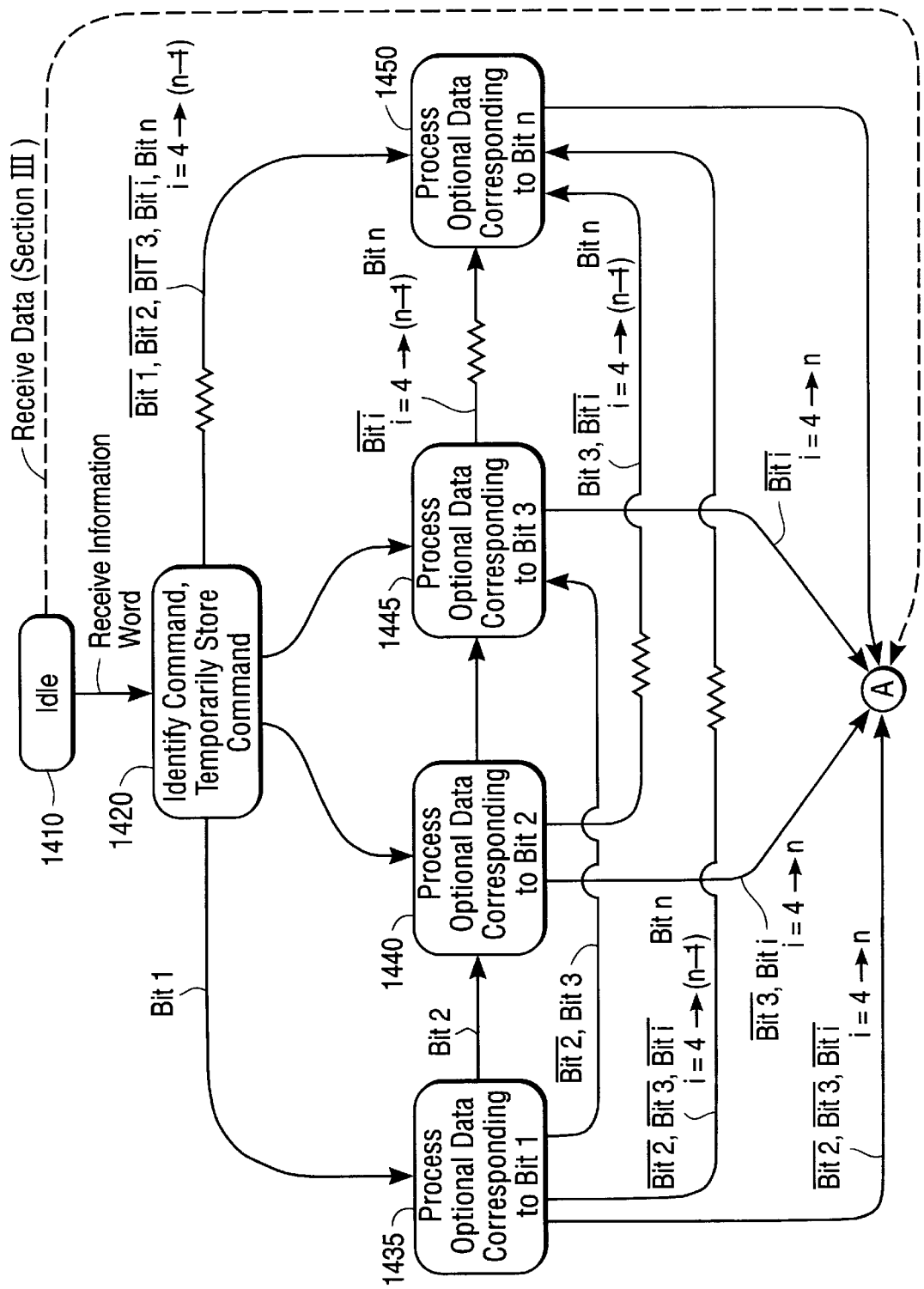
FIGS. 14a–b illustrate a state diagram for an operation of the decoder according to an alternate embodiment of the present invention.
Figure 14B:
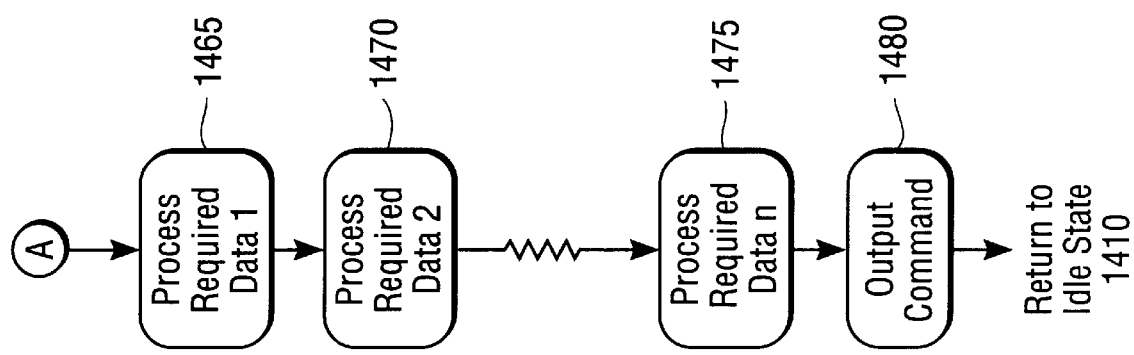

FIGS. 14a–b depict a state diagram illustrating the states of the decoder 160 in performing the method of FIGS. 11a–b. When the decoder receives an information word, the decoder 160 switches from idle state 1410 to the state 1420 of identifying the command in the information word, as well as temporarily storing the command. The decoder 160 then moves to state 1420, where it decodes the indicator bits to determine what optional data will be arriving in the current burst sequence. The decoder 160 then processes the optional data corresponding to each high indicator bit. Processing includes receiving the optional data, determining the address of the register in the processing engine 170 associated with that type of data, and sending the data and its corresponding address to the processing engine 170. For instance, if bit 1 is high, the decoder 160 moves to state 1435 for processing the optional data corresponding to bit 1. From state 1435 the decoder 160 then either moves to a state for processing data that corresponds to the next high bit or, if there are no more high bits, the decoder 160 moves to state 1465. If bit 1 is low, but bit 2 is high, the decoder 160 moves to state 1440 for processing the data corresponding to bit 2. After state 1440, the processor then moves to the state for processing data corresponding to the next high bit or, if there are no more high bits, the decoder 160 moves to state 1465.

In state 1465, the decoder 160 processes the first piece of required data. Processing the required data includes receiving the required data, determining the address of the register in the processing engine 170 associated with that type of data, and sending the data and its corresponding address to the processing engine 170. After state 1465, the decoder 160 processes any remaining required data (states 1470, 1475). After all the required data has been processed, the decoder 160 moves to state 1480, where it sends the command to the processing engine. After state 1480, the decoder 160 returns to the idle state 1410. Note that the dotted line that is labeled "Repeat Command" relates to the embodiment of the invention described in sections III below.

III

When a command is repeated the optional data for the command will often be the same as for the previous command although the required data may be different. In yet another embodiment of the present invention, the command and the optional data are not retransmitted if they are the same as the previous command and optional data.

In this embodiment, the decoder 160 can tell from the first few bits of information it receives whether the information is an information word or whether the information is data. For instance, the first three bits of an information word may be all high bits, and the first three bits of data may all be low bits.

Figure 15:
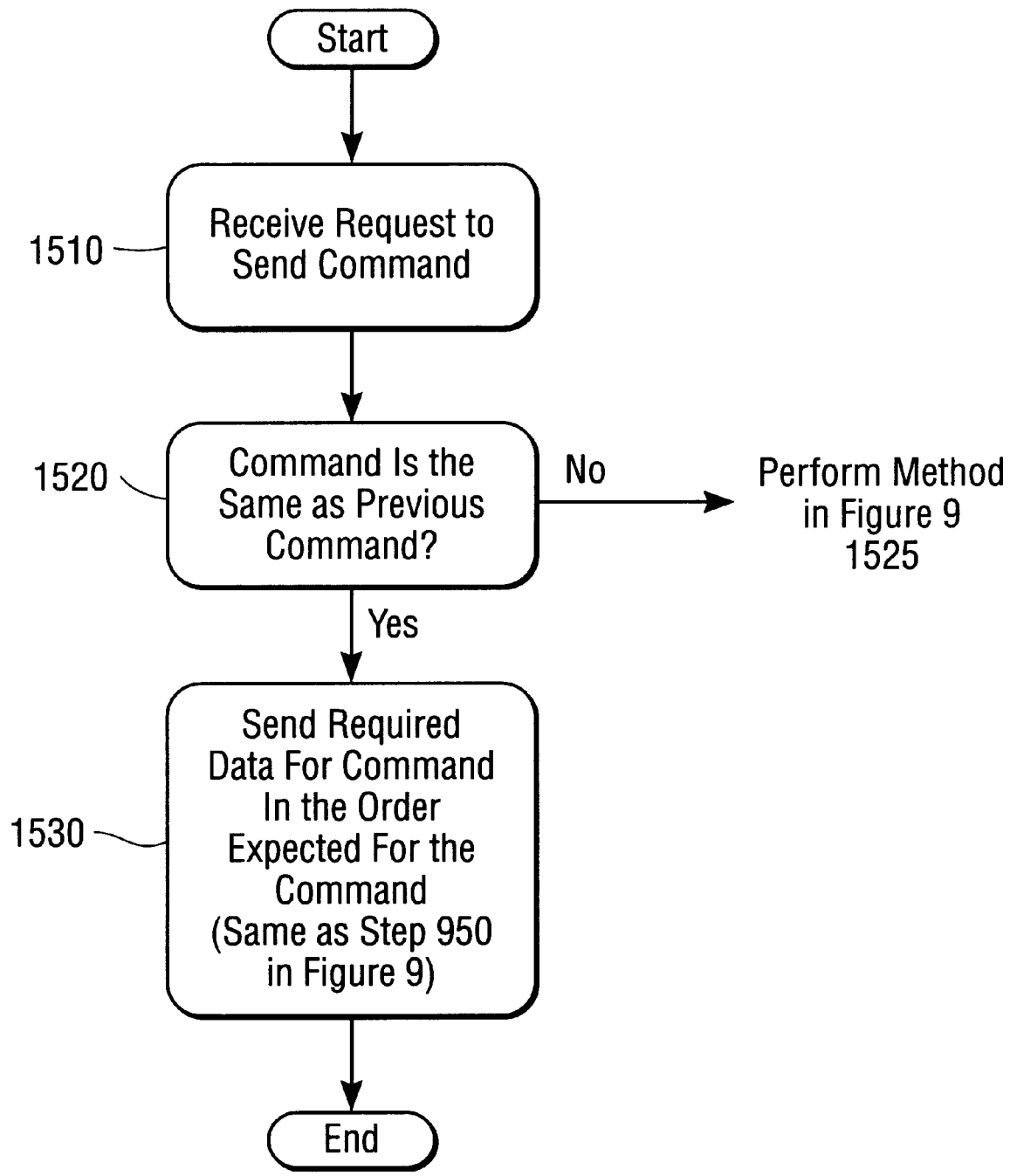
FIG. 15 illustrates a method of the encoder according to a second alternate embodiment of the present invention.

FIG. 15 illustrates the operation of the encoder 130 for this embodiment. The encoder 130 receives 1510 a request to send a command. The encoder 130 determines 1520 whether the command is the same as the previous command. If the command currently requested is different from the previous command, the encoder 130 creates 1525 an information word and sends out the command in accordance with the method of FIG. 9.

If the command is the same as the previous command, the encoder 130 sends 1530 the required data for the previous command without sending an information word or the optional data. The required data is sent in the order expected for the command.

Figure 16:
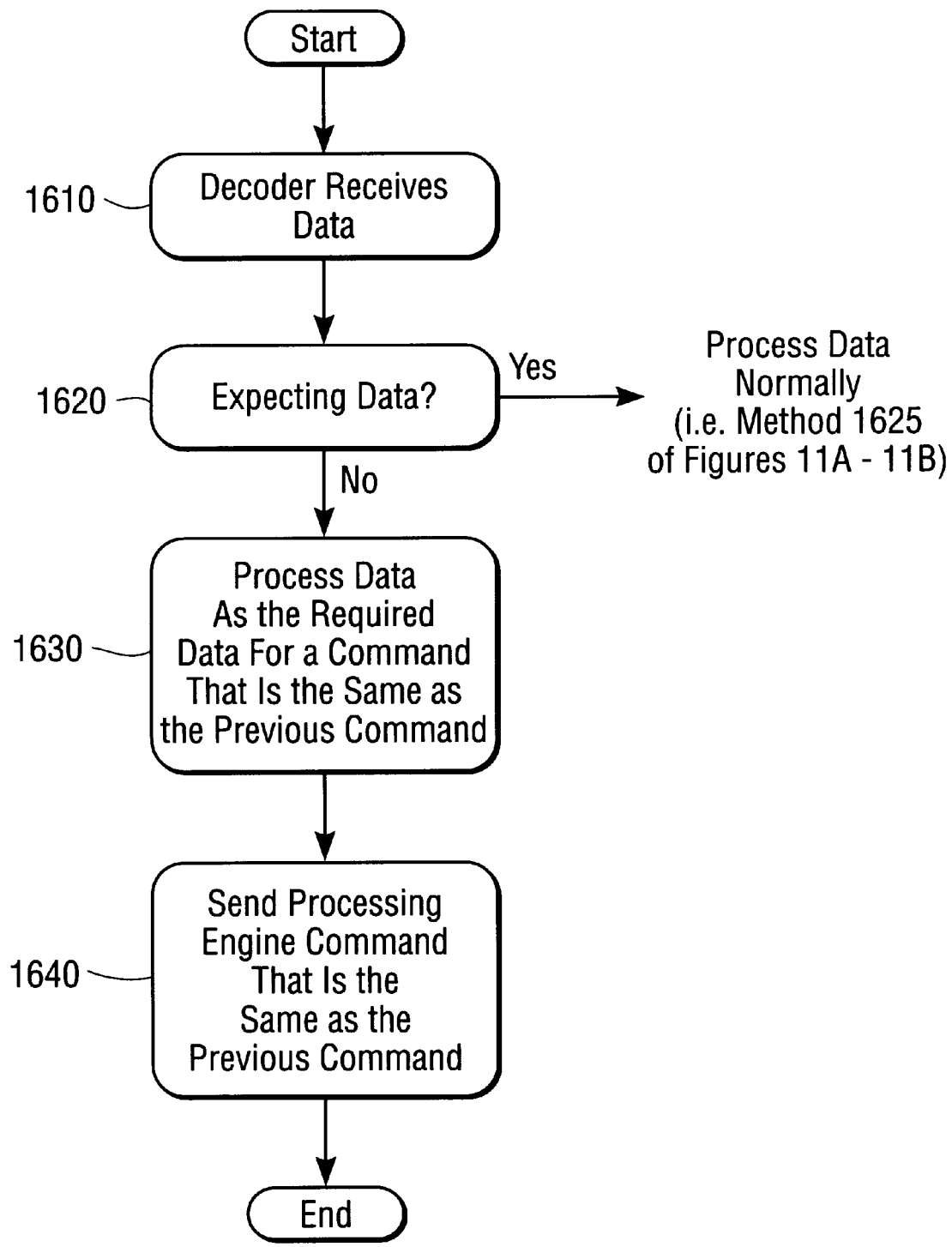
FIG. 16 illustrates a method of the decoder according to a second alternate embodiment of the invention.

FIG. 16 illustrates the operation of the decoder 160 for performing the repeat command method. The decoder 160 receives 1610 data and determines 1620 whether data is expected. If data is expected, the data is processed 1625 in accordance with the method of FIGS. 11a–b. In an information word is expected instead of data, the decoder 160 recognizes that the previous command is being repeated. In accordance with the method of FIGS. 11a–b, the decoder 160 then processes 1630 the subsequent data as required data for the repeated command. After the data has been processed and sent to the processing engine, the decoder 160 sends 1640 the processing engine the same command as the previous command.

The state diagram illustrated in FIGS. 13a–13b applies to this embodiment, except that if the encoder receives a repeat command in the idle state 1300, it proceeds directly to state 1370, skipping over states 1305–1365.

The state diagram for FIGS. 14*a–b* applies to this embodiment. If the decoder receives data while in the idle state 1410, the decoder 160 moves to state 1465 to process the data as required data for the repeated command.

IV

In yet another embodiment of the invention, a command and corresponding data that are being sent in a burst sequence can be aborted by sending another command within the same burst sequence. When the decoder receives the second command, it recognizes that the first command has been aborted.

Figure 17:
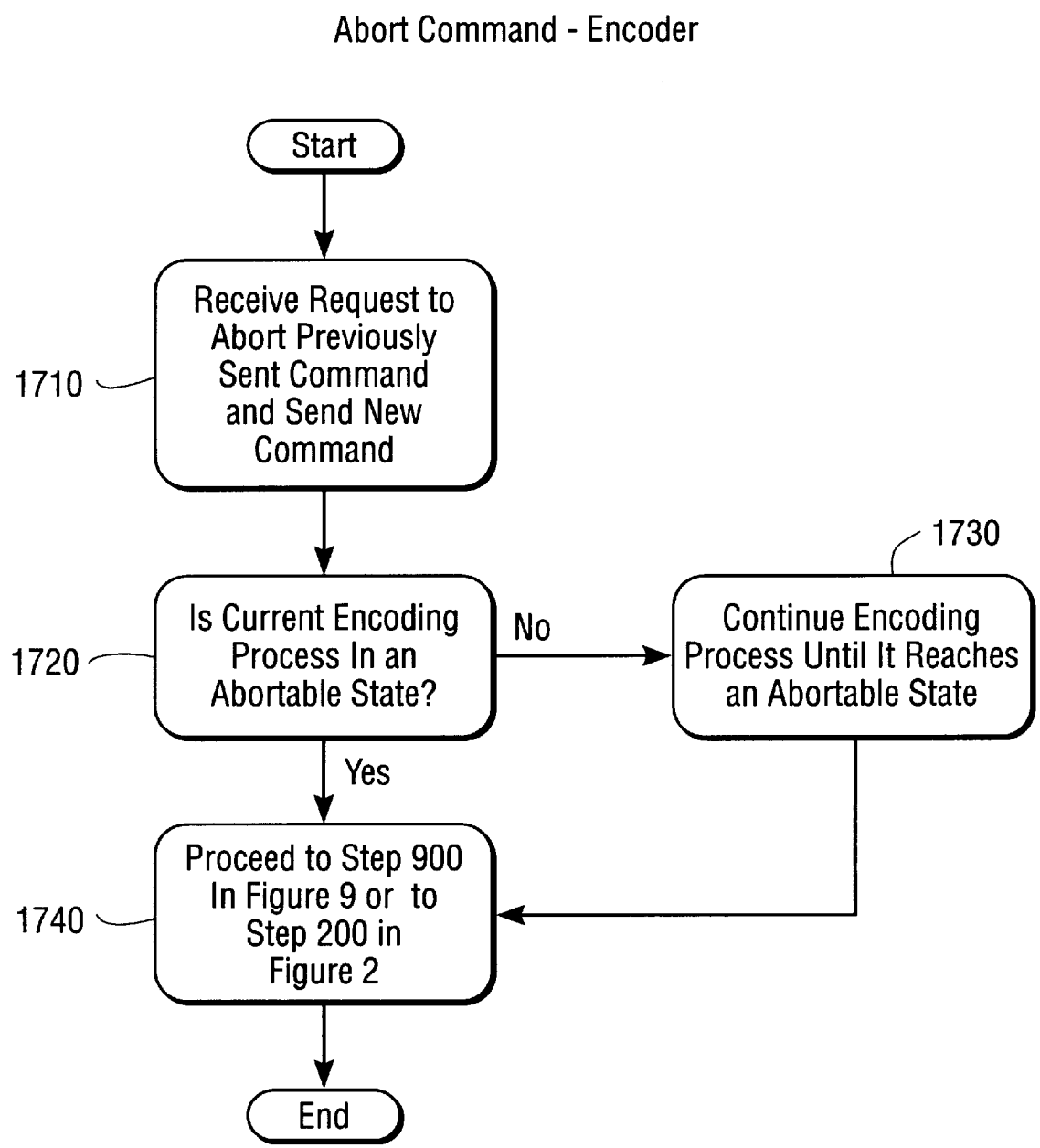
FIG. 17 illustrates a method of the encoder according to a third alternate embodiment of the present invention.

FIG. 17 illustrates the operation of the encoder 130 in this embodiment. The encoder 130 receives 1710 a request to abort a previously received command. The encoder 130 then determines 1720 whether the current encoding process is in an abortable state. If it is not, the encoder 130 continues 1730 the encoding process until it reaches an abortable state. Once the current encoding process is in an abortable state, the encoder 130 starts the encoding process over for a new command. In other words, the encoder 130 performs the method of FIG. 2 or FIG. 9 for the new command. Aborting a command does not necessarily stop the current burst sequence. The new command can be sent out in the same burst sequence.

Figure 18:
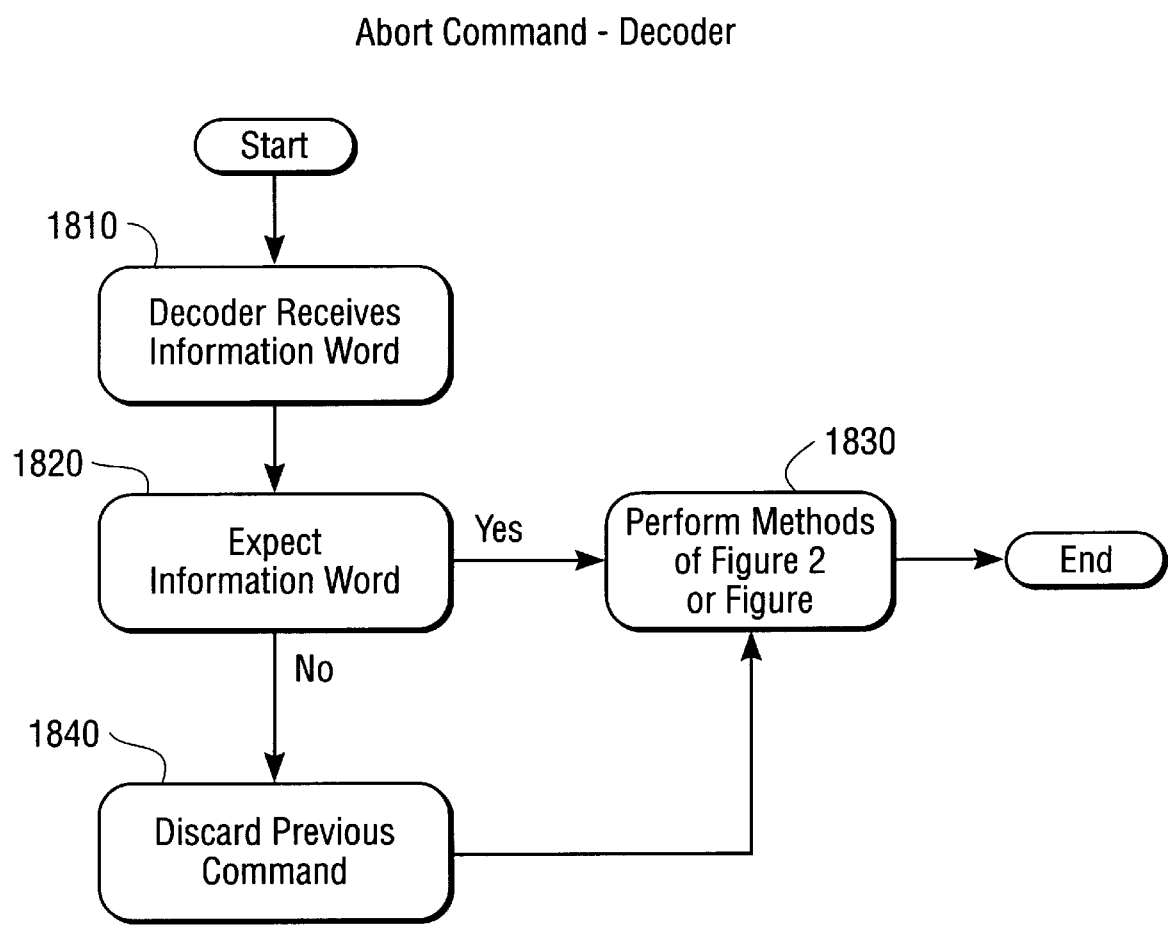
FIG. 18 illustrates a method of the decoder according to a third alternate embodiment of the present invention.

FIG. 18 illustrates the operation of the decoder 160 in this embodiment. The decoder 160 receives 1810 an information word. The decoder 160 determines 1820 whether an information word is expected. If so, the decoder 160 processes 1830 the information word in accordance with the method of either FIGS. 5 or 11*a–b*. Otherwise, the decoder 160 realizes the previous command has been aborted. The decoder 160 then discards 1840 the previous command and processes the new information word in accordance with the method of either FIGS. 5 or 11*a–b*.

The state diagram illustrated in FIGS. 13*a–13b* for the encoder 130 can apply to this embodiment, except that if the encoder receives an abort request and is in an abortable state, it proceeds directly to state 1305 to create a new information word.

Figure 19A:
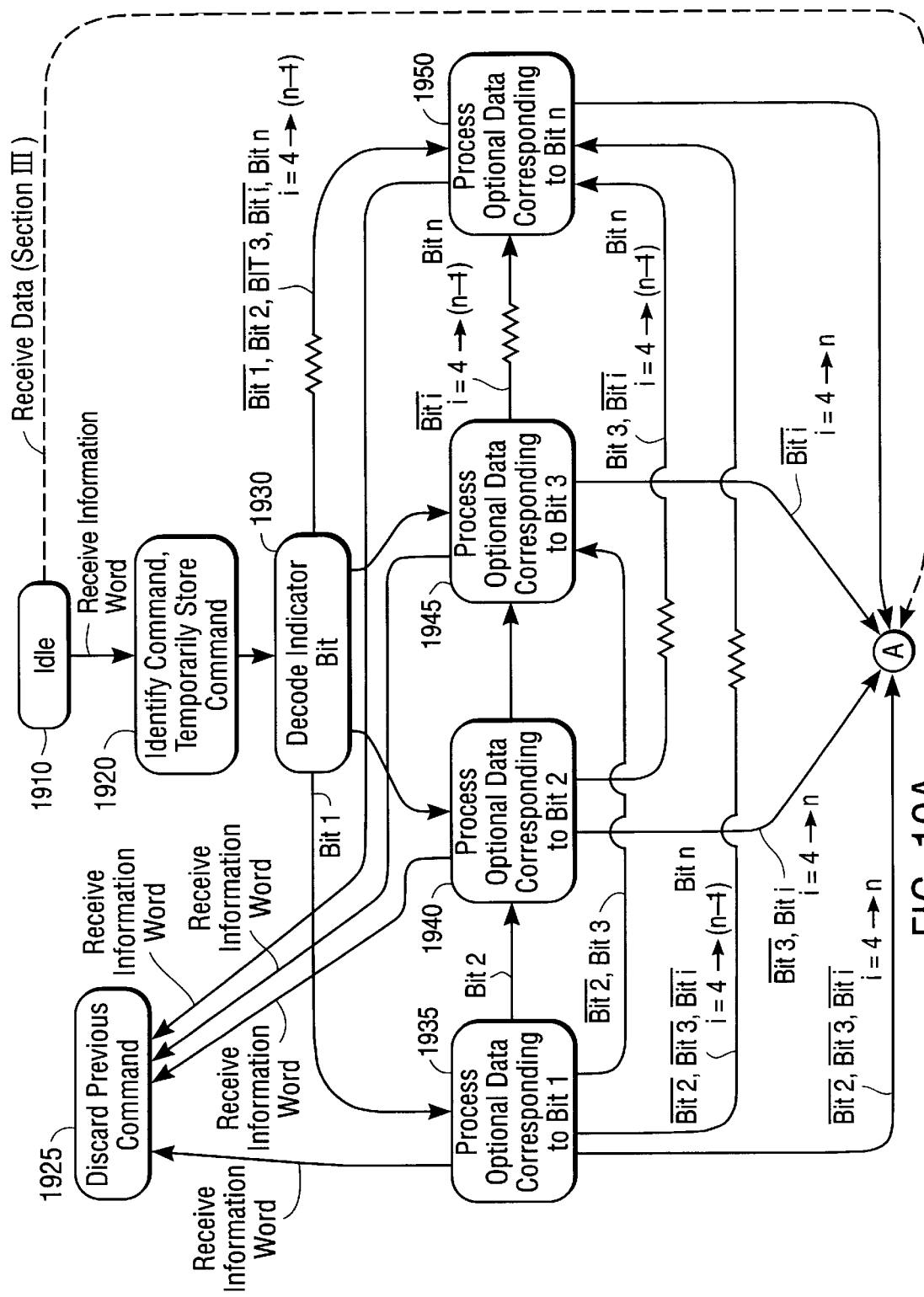
FIGS. 19a–b illustrate a state of the diagram of an operation of the decoder according to a third alternate embodiment of the present invention.
Figure 19B:
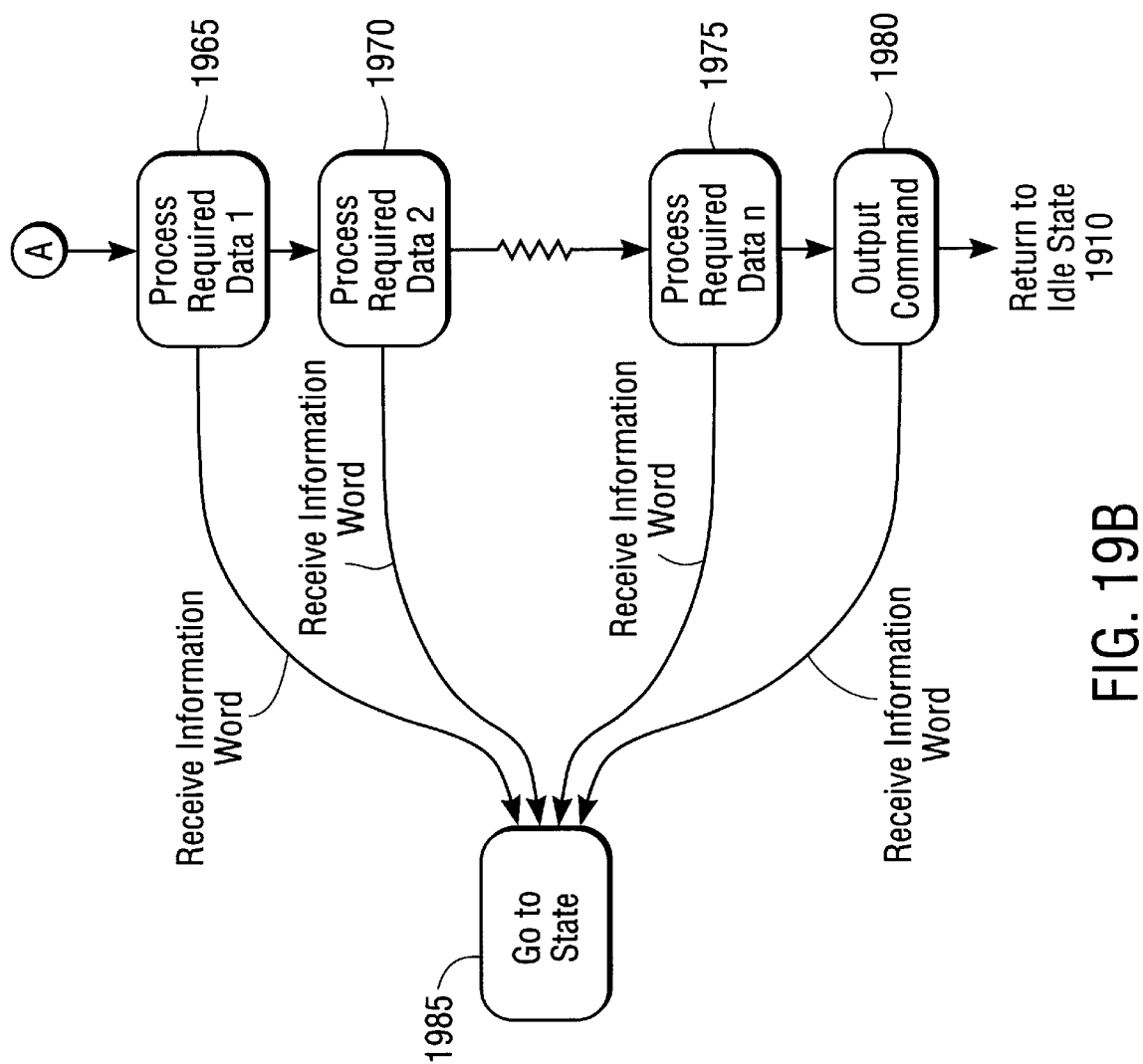

The state diagram illustrated in FIGS. 19*a–b* illustrates a state diagram of the decoder for this embodiment. FIGS. 19*a–b* are the same as FIGS. 14*a–b*, except for the fact that, if the decoder 160 is expecting data, but receives an information word, the decoder 160 moves to state 1985, where it discards the previous command. The decoder 160 then proceeds to state 1920, where it identifies the new command in the information word. The remaining states are the same as those described with respect to FIGS. 14*a–b*.

V

In yet another embodiment of the present invention, an information word is not sent. Instead, the addresses for the command and data are sent to the decoder 160 along with the command and data. Although standard burst mode dictates that only one address be sent, the address, command, and data in the present invention are all sent in the burst mode. Specifically, on the first cycle of the burst mode, the encoder 130 sends the decoder 160 a signal that indicates that the remaining information in the burst mode will be sent in an address/data (or command)/address/data (or command) sequence. Because of the signal, the decoder 160 knows that address information will be arriving every other bus cycle, starting with the burst cycle after the signal. One advantage of this embodiment of the present invention over the SASD method is that the information is sent in burst modes, and thus the transfer is not subject to arbitration delays.

Figure 20A:
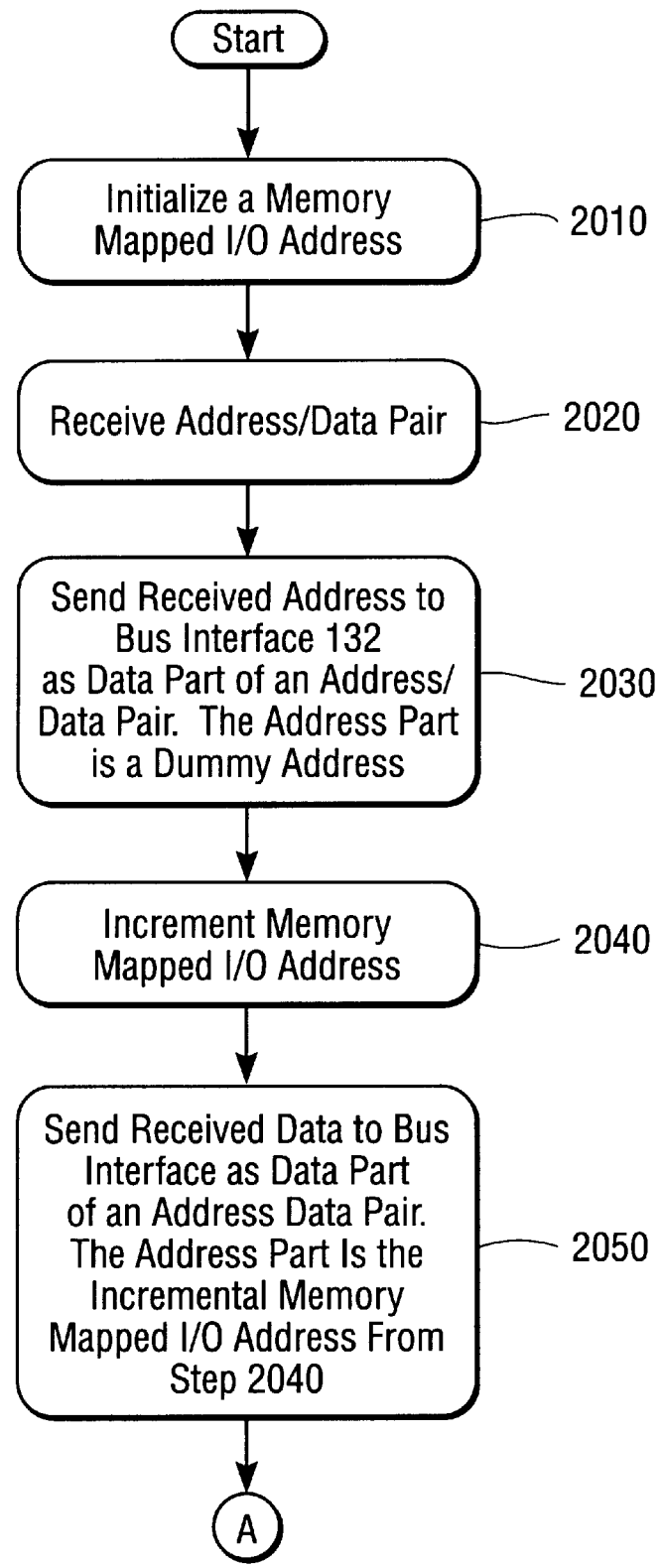
FIGS. 20a–b illustrate a method of the encoder according to a fourth alternate embodiment of the present invention.
Figure 20B:
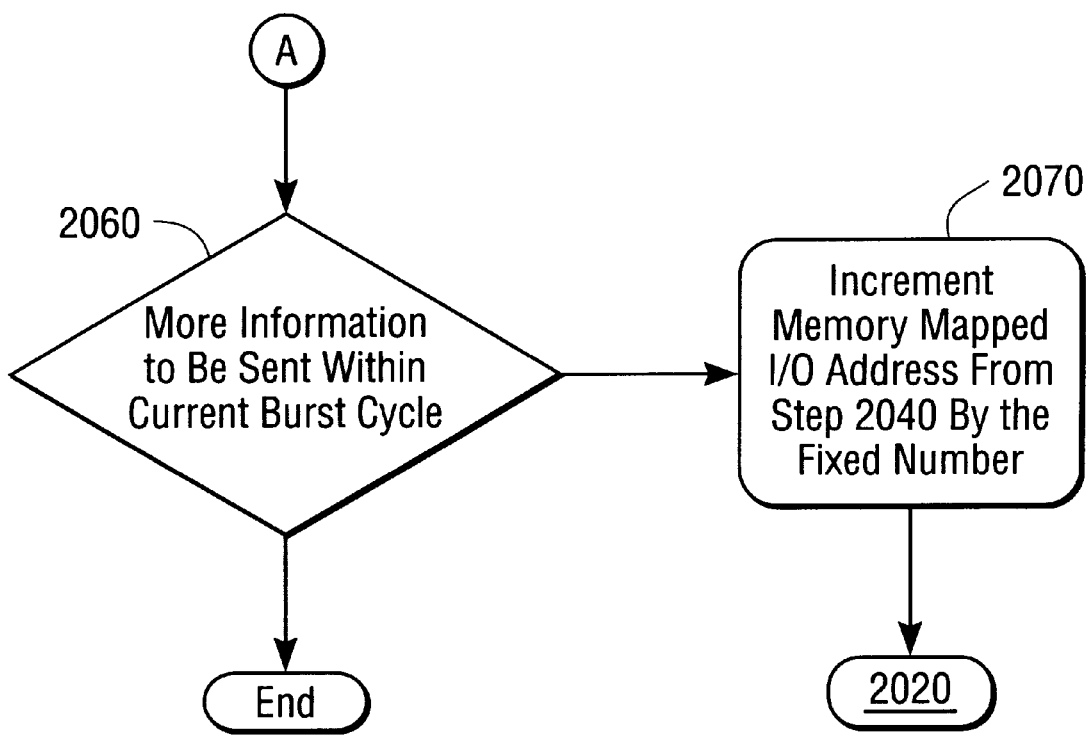

FIG. 20 illustrates an example of the operation of the encoder 130 in performing this method. The encoder 130 initializes 2010 a memory mapped I/O address. This address is a dummy address within a select range that indicates to the co-processor 120 that information will be arriving in a address/data/address/data burst sequence. The encoder 130 receives 2020 an address and data pair. The encoder 130 sends 2030 the received address to the bus interface 132 as the data part of an address/data pair. The address part is the dummy address initialized in step 2010. The encoder 130 then increments 2040 the dummy address by a fixed number (e.g., 4 bytes), and pairs the incremented dummy address with the received data. The pair is then sent 2050 to the bus interface 132.

The encoder 130 then determines 2060 whether there is more information to be sent within the current burst cycle. If so, the encoder 130 increments 2070 the last dummy address and returns to step 2020 to repeat the process, except that the address from step 2070 is used as the dummy address in step 2030. If there is no more information to be sent in the current bus cycle, the process is complete.

Figure 21A:
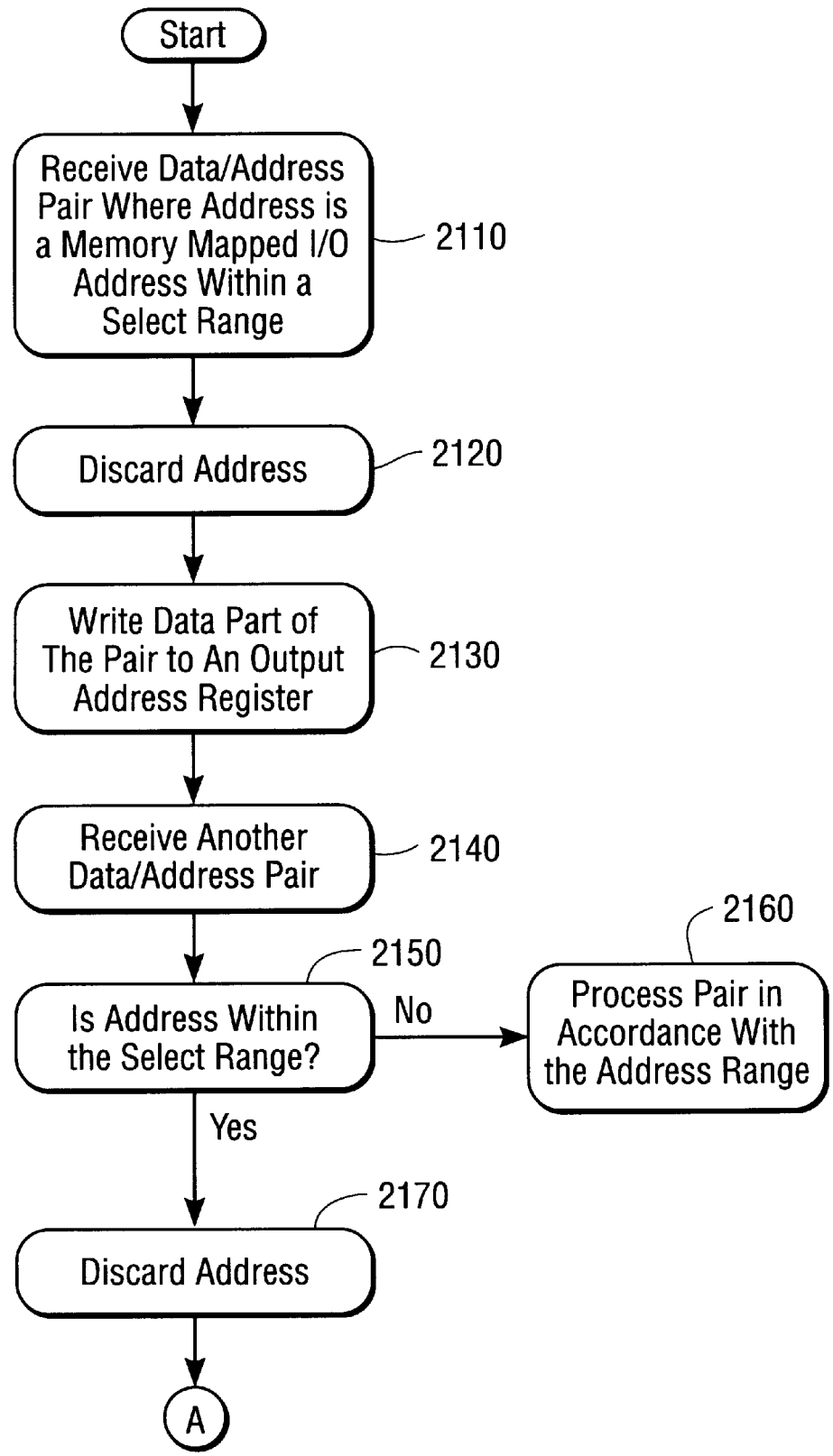
FIGS. 21a–b illustrate a method of the decoder according to a fourth alternate embodiment of the present invention.
Figure 21B:
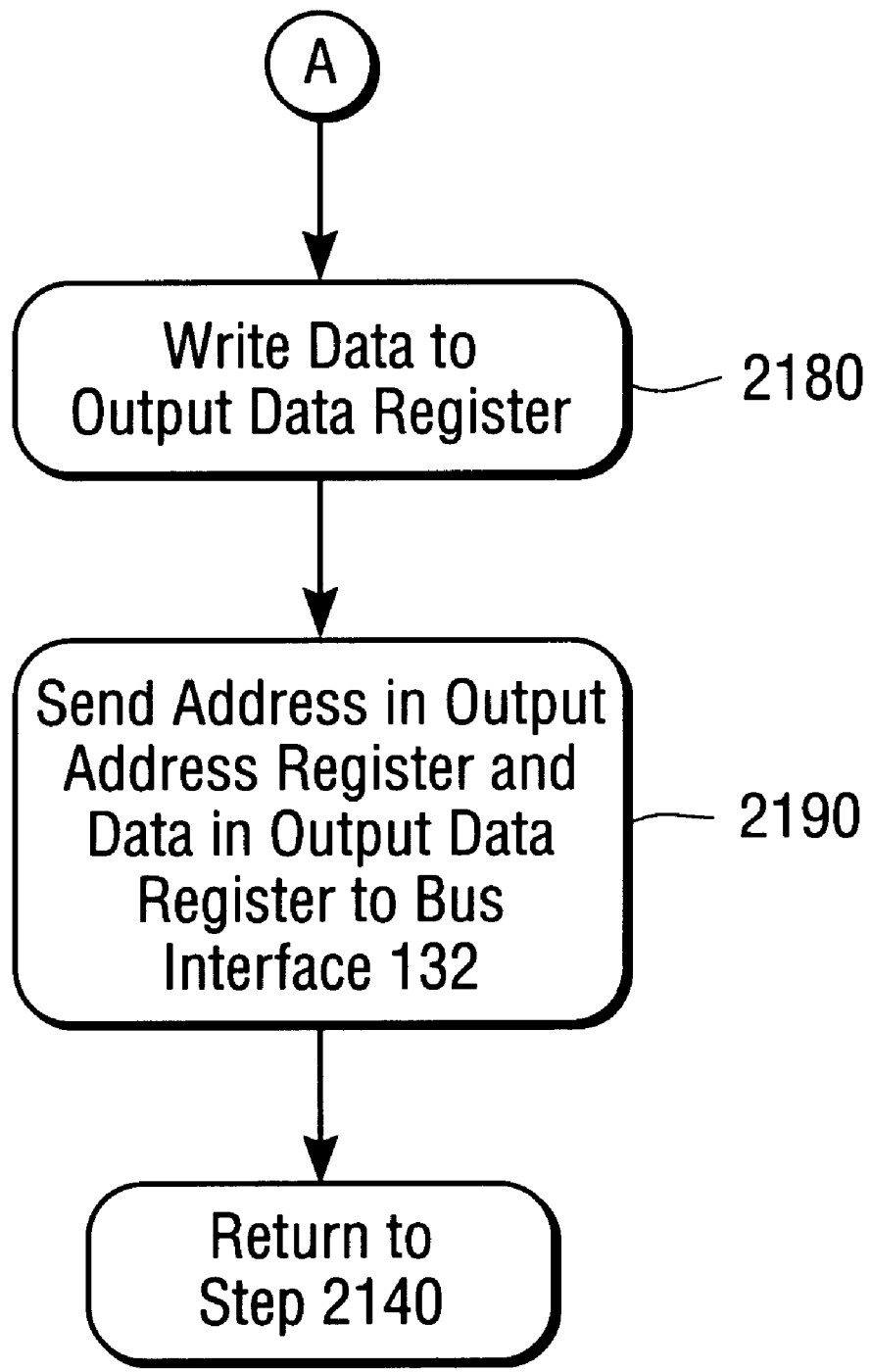

FIG. 21 illustrates the operation of the decoder 160. The decoder 160 receives 2110 a data/address pair, where the address is a memory mapped I/O address within a select range that indicates that information will be arriving in a address/data/address/data burst sequence. The decoder 160 discards 2120 the address part of the pair and places 2130 the data part of the pair into an output address register.

The decoder 160 then receives 2140 a second address/data pair. The decoder 160 determines 2150 whether the address in the second pair is in the select range. If it is not, the address/data pair is processed 2160 in accordance with a method that corresponds to the address range of the address. If the address is in the select range, the decoder 160 discards 2170 the address and places 2180 the data into an output data register. The decoder 160 then sends 2190 the address in the output address register and the data in the output data register to the processing engine as an address/data pair. The decoder then returns to step 2140.

As will be understood by those familiar with the art, the invention mat be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for identifying information received at a processor, the method comprising:

receiving an indication of types of information that will be arriving the indication being a plurality of bits, each of the plurality of bits corresponding to a different type of information;

determining from the indication the types of information that will be arriving and an order in which the information will arrive;

receiving the information; and identifying each of the types of information by the order in which the information is received.

2. The method of claim 1 further comprising:

for each of the types of information received, determining a pre-assigned memory device address associated with at least one of the types of information; and for each type of information received, storing the information at the memory device address associated with at least one of the types of information.

3. The method of claim 1, wherein the determining step comprises determining from a state of each bit whether information corresponding to that bit is expected to arrive.

4. The method of claim 3, determining step further comprises expecting the order in which the information arrives to parallel an order of the bits.

5. A method for identifying required data and optional data associated with a command and sent by a first processor to a second processor, the method comprising:

receiving at the second processor the command and an indication of a type of any optional data that the first processor is or will be sending to the second processor;

identifying the command at the second processor;

based on an identity of the command, determining at the second processor a type of required data that the first processor is or will be sending to the second processor;

determining from the indication the type of any optional data the first processor is or will be sending to the second processor;

receiving the required data and the optional data; and identifying each type of optional data and required data by an order in which the optional data and required data arrive.

6. The method of claim 5, further comprising the steps of:

determining a pre-assigned memory device address associated with each of the types of optional and required data received; and for each type of optional and required data received, storing the optional and required data received at the memory device address associated with at least one of the types of optional and required data.

7. The method of claim 5, wherein the step of receiving at the second processor the command comprises receiving a plurality of bits, each of the plurality of bits corresponding to a different type of optional data.

8. The method of claim 7, wherein the step of receiving the required data and the optional data comprises the substep of determining from the state of each bit whether optional data corresponding to that bit is or will be sent by the first processor to the second processor.

9. A method for receiving information at a location and for storing the information in a memory device, the method comprising:

assigning each of select types of information to an address in the memory device;

receiving an indication of which of the select types of information is being or will be transferred to the location;

determining from the indication which of the select types of information is being or will be transferred to the location;

receiving at the location a first information having a type identified in the indication; and storing the first information in the memory device, each different type of information being stored at an address in the memory device assigned to the type of information.

10. The method according to claim 9, wherein the step of receiving the indication comprises receiving a plurality of bits, each bit representing a different one of the select types of information and each bit having a first state and a second state, the first state indicating that the type of information corresponding to a bit will not be sent to the location and the second state indicating that the type of information corresponding to a bit will be sent to the location.

11. The method according to claim 10, wherein the determining step comprises determining from a state of each bit which of the select types of information to expect.

12. A method for receiving information at a location and for storing information received in a memory device, the method comprising:

receiving a command;

anticipating, based on the command, receiving a first select set of information, the first select set of information comprises a plurality of types of information determining an order of receipt for each member of the first select set of information; and receiving the first select set of information; and storing the first select set of information in a memory device, each of the plurality of types of information assigned to a different address in the memory device.

13. The method of claim 12 further comprising the steps of:

assigning each of a second select types of information to an address in the memory device;

receiving an indication of which of the second select types of information will be transferred to the location;

determining from the indication which of the second select types of information will be transferred to the location;

receiving the second select information identified in the indication; and storing the received second select information in the memory device, each different type of information being stored at an address in the memory device assigned by type of information.

14. A method for receiving an address/data pair, the method comprising:

receiving an address in a first select range;

receiving a first data;

identifying the first data as an address in a second select range;

receiving a second data; and pairing the second data with the address in the second select range.

* * * * *